(12) United States Patent
Hudson et al.

(10) Patent No.: US 8,109,005 B2
(45) Date of Patent: Feb. 7, 2012

(54) DUAL-GLOBE LEVEL

(76) Inventors: Robert B. Hudson, Naperville, IL (US); Walter J. Sedlacek, West Chicago, IL (US); Sajid Patel, Arlington Heights, IL (US)

( * ) Notice: Subject to any disclaimer, the term of this patent is extended or adjusted under 35 U.S.C. 154(b) by 189 days.

(21) Appl. No.: 12/500,028

(22) Filed: Jul. 9, 2009

(65) Prior Publication Data
US 2010/0005671 A1 Jan. 14, 2010

Related U.S. Application Data

(60) Provisional application No. 61/079,824, filed on Jul. 11, 2008.

(51) Int. Cl.
*G01C 9/20* (2006.01)
(52) U.S. Cl. .................. 33/377; 33/379; 33/390
(58) Field of Classification Search .............. 33/377, 33/379, 451
See application file for complete search history.

(56) References Cited

U.S. PATENT DOCUMENTS

| | | | |
|---|---|---|---|
| 25,446 A | 9/1859 | Scoville | |
| 191,954 A | 6/1877 | Gissenger | |
| 505,937 A | 10/1893 | Brown | |
| 812,261 A | 2/1906 | Alexander | |
| 842,874 A | 2/1907 | Downs | |
| 898,092 A | 9/1908 | Carrier | |
| 899,269 A | 9/1908 | Staley | |
| 949,842 A | 2/1910 | Pugh | |
| 970,360 A | 9/1910 | Whigham | |
| 1,058,320 A | 4/1913 | Mitchell et al. | |
| 1,098,381 A | 6/1914 | Hartley | |
| 1,166,019 A | 12/1915 | Taylor et al. | |
| 1,188,158 A | 6/1916 | De Tullio | |
| 1,277,748 A | 9/1918 | Owen | |
| 1,291,930 A | 1/1919 | Stitzel | |
| 1,294,710 A * | 2/1919 | Roland | 33/352 |
| 1,373,336 A | 3/1921 | Knapp | |
| 1,523,315 A | 1/1925 | Tone | |
| 1,586,153 A | 5/1926 | Hunter | |
| 1,691,632 A | 11/1928 | Bartow | |
| 1,709,227 A | 4/1929 | Norgaard | |
| 1,829,257 A | 10/1931 | Best et al. | |
| 1,855,651 A | 4/1932 | Roberson | |
| 1,860,259 A | 5/1932 | Marshall | |
| 1,898,367 A | 2/1933 | Heinze | |
| 1,924,761 A | 8/1933 | Turner | |

(Continued)

*Primary Examiner* — Yaritza Guadalupe-McCall
(74) *Attorney, Agent, or Firm* — David A. Gottardo

(57) ABSTRACT

The dual-globe level comprises at least one indicator located on a body. The body defines front and rear faces, a pair of opposing ends, and at least one longitudinal surface. The at least one indicator comprises an inner vessel located within an outer vessel, and more preferably, a substantially spherical inner globe located within an outer globe and buoyantly supported within the outer globe. The inner globe, viewable through the outer globe and defining an equator around its outer periphery, is buoyantly biased within to maintain the equator in a substantially horizontal position. The equator is in operable registry relation with a first indicia to indicate a position of the at least one longitudinal surface of the body in relation to a surface or line in question located adjacent thereto. The inner globe also includes a polar marking concentrically centered within the outer periphery of the upper hemisphere defined by the equator, with the marking in operable registry relation with the first indicia to indicate a position of the rear face of the body in relation to a surface in question located adjacent thereto. In other embodiments, marking is in operable registry relation with a second indicia to indicate a position of the front face of the body in relation to the surface in question located adjacent thereto.

41 Claims, 21 Drawing Sheets

U.S. PATENT DOCUMENTS

| | | | |
|---|---|---|---|
| 1,988,591 A | 1/1935 | Gillmor | |
| 1,992,675 A | 2/1935 | Potsubay | |
| 2,026,895 A | 1/1936 | Hudlow | |
| 2,067,474 A | 1/1937 | Carbonara | |
| 2,169,342 A | 8/1939 | Hewitt, Jr. et al. | |
| 2,206,003 A | 6/1940 | Donnell | |
| 2,260,396 A | 10/1941 | Otto, Jr. | |
| 2,342,359 A | 2/1944 | Mitchell | |
| 2,429,754 A | 10/1947 | Hagner | |
| 2,476,428 A | 7/1949 | Nagoda | |
| 2,482,688 A | 9/1949 | Musal | |
| 2,584,917 A | 2/1952 | Powell | |
| 0,605,553 A | 8/1952 | Kunkel | |
| 2,635,350 A | 4/1953 | Bettega | |
| 2,645,030 A | 7/1953 | Mahone | |
| 2,694,866 A | 11/1954 | Hanauer | |
| 2,765,541 A | 10/1956 | Story | |
| 2,775,044 A | 12/1956 | Beebout | |
| 2,847,765 A | 8/1958 | Bateman | |
| 2,859,533 A | 11/1958 | Prades | |
| 3,061,920 A | 11/1962 | Johnson | |
| 3,084,443 A * | 4/1963 | Kaatz et al. | 33/352 |
| 3,169,552 A | 2/1965 | Richards | |
| 3,191,306 A | 6/1965 | Kierans | |
| 3,225,451 A | 12/1965 | Olexson et al. | |
| 3,233,235 A | 2/1966 | Wright | |
| 3,513,558 A | 5/1970 | Kuchta et al. | |
| 3,516,055 A * | 6/1970 | Snider | 33/330 |
| 3,533,167 A | 10/1970 | Thompson | |
| 3,591,925 A | 7/1971 | Dupin | |
| 3,706,225 A | 12/1972 | Stimson | |
| 3,785,544 A | 1/1974 | Smith | |
| 3,800,426 A | 4/1974 | Nakamura | |
| 3,916,531 A | 11/1975 | Morton | |
| 3,956,831 A | 5/1976 | Sibley | |
| 4,011,660 A | 3/1977 | Johnson | |
| D243,931 S | 4/1977 | Pitkin et al. | |
| 4,096,638 A | 6/1978 | Schimming | |
| 4,278,854 A | 7/1981 | Krause | |
| 4,343,090 A | 8/1982 | Bergkvist | |
| 4,441,812 A | 4/1984 | Feist | |
| 4,492,029 A | 1/1985 | Tanaka et al. | |
| 4,513,509 A | 4/1985 | Nordstrom | |
| 4,534,117 A | 8/1985 | Haefner et al. | |
| 4,546,549 A | 10/1985 | Duperon | |
| 4,559,714 A | 12/1985 | Wright | |
| 4,624,140 A | 11/1986 | Ekchian et al. | |
| 4,669,195 A | 6/1987 | Griffin | |
| 4,745,687 A | 5/1988 | Wilhelmy | |
| 4,747,217 A | 5/1988 | Austin | |
| 4,843,725 A | 7/1989 | Harris | |
| 4,854,047 A | 8/1989 | Conanan | |
| 4,902,129 A * | 2/1990 | Siegmund et al. | 33/377 |
| 4,914,823 A | 4/1990 | Harris | |
| 4,995,169 A | 2/1991 | Lunden | |
| 5,388,337 A | 2/1995 | Powers, II | |
| 5,452,519 A | 9/1995 | Crocker et al. | |
| 5,467,532 A * | 11/1995 | Ames | 33/334 |
| 5,476,258 A | 12/1995 | Frisone | |
| D389,756 S | 1/1998 | Gruetzmacher | |
| 5,749,152 A | 5/1998 | Goss et al. | |
| 5,794,355 A * | 8/1998 | Nickum | 33/366.16 |
| 5,806,197 A * | 9/1998 | Angelucci | 33/451 |
| 6,032,376 A | 3/2000 | Shurtleff | |
| 6,073,356 A | 6/2000 | Li | |
| 6,098,300 A * | 8/2000 | Angelucci | 33/451 |
| 6,209,219 B1 | 4/2001 | Wakefield et al. | |
| 6,357,128 B1 | 3/2002 | Iden | |
| 6,516,526 B1 | 2/2003 | Iden | |
| 6,578,274 B1 | 6/2003 | Tango, Jr. et al. | |
| 6,640,453 B2 | 11/2003 | Eisenmenger | |
| 6,779,276 B1 * | 8/2004 | Turner | 33/379 |
| 6,935,035 B2 | 8/2005 | Smith | |
| 6,990,742 B1 * | 1/2006 | Schmidt | 33/377 |
| 7,089,674 B1 | 8/2006 | Hendon | |
| 7,152,335 B2 | 12/2006 | Nichols | |
| 2009/0320303 A1 * | 12/2009 | Sparrow | 33/348 |

* cited by examiner

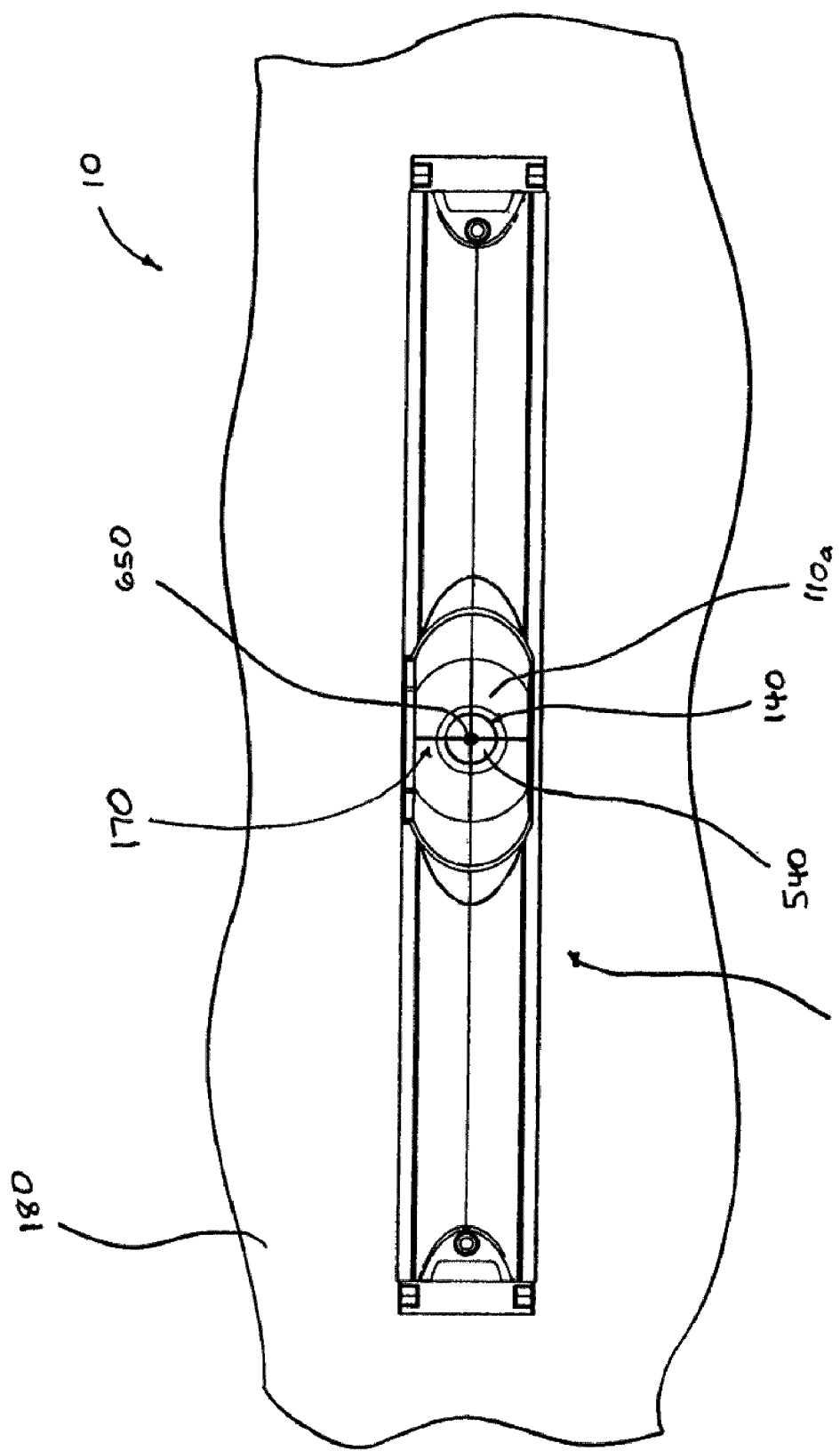

DUAL-GLOBE LEVEL

CROSS REFERENCE TO RELATED APPLICATIONS

This application claims priority to U.S. Provisional Application Ser. No. 61/079,824 filed on Jul. 11, 2008.

TECHNICAL FIELD OF THE INVENTION

This invention relates generally to construction levels and similar leveling devices, and more particularly to levels that are easier to read, can measure angles and pitches, and indicate and/or measure the level of a plane along at least two directions, using a single tool.

BACKGROUND OF THE INVENTION

Levels are used extensively within the construction industry. They enable a determination of whether a given line or surface is horizontal or vertical when the level is positioned on the line or surface. Some levels also enable a determination of the angular inclination and/or pitch (i.e., rise and run) of a given line or surface from the horizontal or vertical.

Various types of levels are known within the industry. The most common type of level is the bubble level, also known as the "spirit level." This type of level typically comprises an elongated body defining upper and lower longitudinal surfaces, a pair of opposing, outer ends, and has at least one liquid-filled tube or vial mounted thereon. The liquid-filled tube or vial contains a gas bubble therein while the tube or vial itself is centrally marked with one or more paired lines that define a center widow. The tube or vial is mounted to the elongated body in a generally horizontal or vertical position such that the gas bubble moves to within the center window (i.e., between the pair of lines) when the level is positioned along a respective horizontal or vertical line or surface.

For a determining whether a given line or surface is approximately horizontal (i.e., level), the liquid-filled tube is mounted to the lengthwise, elongated body, there-along or parallel therewith, such that the tube is generally horizontal and the gas bubble falls within the center window when the upper or lower edge of the body of the level is placed along a horizontal line or surface. For determining whether a given line or surface is approximately vertical (i.e., plumb), the liquid-filled tube is mounted to the lengthwise, elongated body, perpendicular thereto, such that the tube is generally horizontal and the gas bubble falls within the center window when the upper or lower edge of the body of the level is placed along a vertical line or surface. Thus, this type of level is generally limited to determining whether a given line or surface is approximately horizontal or vertical.

A variation of the bubble or spirit level has a liquid-filled tube or vial that is manually rotatable in relation to the elongated body such that the tube is generally horizontal and the gas bubble is maintained within the center window (i.e., between the paired lines) when the upper or lower longitudinal surface of the body of the level is placed along a line or surface having a predetermined angle from the vertical or horizontal. Such levels generally include markings or indicia thereon that indicate the degree of angle of inclination and/or pitch (i.e., rise and run) of such a line or surface from the horizontal or vertical when the gas bubble is within the window.

While bubble or spirit levels are simple and inexpensive, they suffer from disadvantages because their accuracy is subject to error. The position of the gas bubble within the window (i.e., between the pair of lines) is typically determined by comparing the alignment of the bubble's outer periphery with the tube's paired lines defining the window. When the upper or lower edge of the body of the level is placed along an ideally horizontal or vertical line or surface, the outer periphery of the bubble should fall equally and/or tangentially between the paired lines of the window. The accuracy errors may be attributed to the fact that a determination of the position of the bubble's periphery in relation to the paired lines of the central window is merely a visual approximation. Such an approximation may be negatively affected by physical factors, to include capillary effects existing between the liquid tube's inner surface, and temperature and pressure conditions which may cause an increase or decrease in size and/or volume of the gas bubble within the liquid.

Thus, other types of levels have been devised that do not utilize gas bubbles within liquid-filled tubes. Such levels, generally referred to as pendulum levels, accordingly utilize pendulum indicators mounted to the elongated body to determine whether a given line or surface is horizontal or vertical when an upper or lower longitudinal surface of the body of the level is placed there-along. The pendulum, comprising a weighted body suspended from a fixed point so as to swing freely under the influence of gravity, and typically including an indicator located diametrically opposite of the weighted body, generally will always maintain a vertical orientation. These pendulum levels generally include markings or indicia thereon, referenced from the vertical orientation of the pendulum, such that the degree of angle of inclination and/or pitch (i.e., rise and run) of a given line or surface from the horizontal or vertical may be readily determined.

For determining whether a given line or surface is approximately horizontal (i.e., level), the pendulum will generally be oriented perpendicular to the lengthwise, elongated body of the level when an edge of the level is placed along a horizontal line or surface. For determining whether a given line or surface is approximately vertical (i.e., plumb), the pendulum will generally be oriented parallel to the lengthwise, elongated body of the level when an edge of the level is placed along a vertical line or surface. A variation of the pendulum level includes markings or indicia thereon, referenced from the vertical orientation of the pendulum, such that the degree of angle of inclination and/or pitch (i.e., rise and run) of a given line or surface from the horizontal or vertical may be readily determined.

Like bubble or spirit levels, pendulum levels suffer from disadvantages. One such disadvantage includes a limitation of a use of the device along a single plane. Because a pendulum vertically swings from an axial pivot, movement of the pendulum is thus limited to a vertical plane of rotation about a horizontal, rotational axis. Thus, for a pendulum level to indicate whether a given line or surface is vertical or horizontal, the vertical plane of rotation of the pendulum must be maintained such that the pendulum may swing freely to its vertical, indicative orientation. Thus, where a pendulum is axially mounted to the elongated body of a level, the use of the level is limited this vertical plane or rotation. In other words, the level is rendered useless or inaccurate if it is "turned on its side" or oriented in any position outside the pendulum's vertical plane of rotation.

Another disadvantage of pendulum levels includes the fact that a swinging pendulum may oscillate (i.e., swing to and fro) before coming to rest to indicate its ultimate, vertical orientation. Although a frictional or spring-biased damper may be utilized on the axial pivot of the pendulum to minimize its oscillatory, swinging movement, such a damper may jeopardize the accuracy of the pendulum by not allowing it to reach its ultimate, vertical and indicative orientation.

Yet other types of levels have been devised with a body utilizing upwardly-facing spherical or semi-spherical liquid-filled "bulls-eye" vials having a gas bubble therein. The gas bubble, floating against the underside of the spherical or semi-spherical vial, may center itself at the intersection of two intersecting axes or windows and/or within one or more concentric circles located on the vial, thus allowing the upwardly-facing level to provide level information relative to a planar surface. However, in addition to suffering from the same disadvantages inherent in spirit levels relating to accuracy and the negative effect of physical factors, bulls-eye levels also suffer from disadvantages relating to versatility. For example, bulls-eye levels are difficult to use in relation to indicating and/or measuring level and plumb values along a single direction.

SUMMARY OF THE INVENTION

The level comprises at least one indicator located on a body. The body defines front and rear faces, a pair of opposing ends, and at least one longitudinal surface, preferably lower and upper longitudinal surfaces, with the body being elongated or non-elongated as well. An outer vessel of the at least one indicator is located at least partially between the front and rear faces of the body to define front and rear outer vessel faces. In the preferred embodiments, the outer vessel defines a spherical outer globe of the at least one indicator located at least partially between the front and rear faces of the body to define front and rear outer globe faces. In other embodiments, the outer vessel may define other geometric shapes defining front and rear faces as understood in the art. The front and rear faces of the body optionally include a bezel's front and rear faces, with the bezel securing the outer globe at least partially between the front and rear faces of the body.

An inner vessel of the at least one indicator is located within the outer vessel. The inner vessel, viewable through the outer vessel and defining an equator around its outer periphery, is buoyantly biased to maintain the equator in a substantially horizontal position. The inner vessel may be buoyantly supported within the outer vessel via a liquid or via a mechanical means. The equator is in operable registry relation with a first indicia to indicate a position of the at least one longitudinal surface of the body in relation to a surface or line in question located adjacent to the at least one longitudinal surface. Embodiments of the inner vessel may define various geometric shapes understood in the art capable of maintaining a buoyant position. However, in preferred embodiments, the inner vessel comprises a substantially spherical inner globe, with the inner globe located within the outer globe and supported by liquid located within the outer globe. The inner globe, viewable through both the liquid and the outer globe and again defining an equator around its outer periphery, is buoyantly biased within the liquid to maintain the equator in a substantially horizontal position. In other embodiments, the substantially spherical inner globe is located within the outer globe and is supported by mechanical means located therebetween, with the inner globe again viewable through the outer globe, defining an equator around its outer periphery, and buoyantly biased to maintain the equator in a substantially horizontal position.

In one embodiment, the lower and upper longitudinal surfaces and front and rear faces of the level's body define an arcuate, "I" shaped cross-section. However, in other embodiments, the front and rear faces define a body having a rectangular cross section as well. It is yet further understood that, regardless of the cross-sectional shape of the level's body, the outer vessel (i.e., globe), in being located at least partially between the front and rear faces of the body, may be located fully between the front and rear faces as well. The lower and upper portions of the respective front and rear faces each preferably define planar surfaces adapted for contact with a given planar surface in question. The lower and upper longitudinal surfaces of the at least one longitudinal surface each preferably define planar surfaces oriented perpendicular to the front and rear faces of the body and adapted for contact with a given planar surface in question to be referenced by the level.

A lengthwise groove may be defined in either or both of the lower and upper longitudinal surfaces, with the groove is adapted for contact with the edge of a given planar surface in question and/or the outer surface of a round member, such as a pipe, to be referenced by the level. A lengthwise cutout may also be defined in either or both of the lower and upper longitudinal surfaces to allow a user of the level to more easily view the indicator. Optional end caps may be located at the body's outer ends as well to protect the ends of the level's body from impact damage if the level is inadvertently dropped by the user. An adjustment mechanism may also be located on the level to allow a manufacturer to rotate the indicator about approximate horizontal and vertical axes to adjust for manufacturing tolerances and ensure that the indicator is true in relation to the level's body.

The inner globe includes the equator, defined around its outer periphery, that is in operable registry relation with the first indicia to indicate a position of the at least one longitudinal surface of the body in relation to the adjacent surface or line in question. In one embodiment, the first indicia comprises X and Y axes intersecting one another at 90 degrees, with the outer ends of the axes located on the front face of the level about the outer vessel (i.e., globe) of the indicator to define four quadrants. Assuming a horizontal orientation of the body, the lines of the X and Y axes define horizontal and vertical reference lines, with the horizontal X axis lying parallel to the lower and upper longitudinal surfaces of body and the vertical Y axis lying perpendicular to the X axis and the body's lower and upper longitudinal surfaces. The quadrants of the first indicia discussed above may optionally include markings indicating indexed angle and/or pitch values, respectively.

The first indicia may additionally or alternatively include a horizontal circumferal equator and a vertical circumferal line preferably located on the front face of the outer globe that intersect one another at 90 degrees. The circumferal equator and vertical circumferal lines define X and Y axes on the front face of the outer globe that, in turn, define horizontal and vertical reference lines. In defining horizontal and vertical reference lines, the outer globe's horizontal X axis again lies parallel to the lower and upper longitudinal surfaces of the body while its vertical Y axis again lies perpendicular to the X axis and the body's lower and upper longitudinal surfaces. If used in addition to the X and Y axes located on the front face of the body, the X and Y axes of the outer globe are respectively aligned with the outer ends of the X and Y located about the globe.

With regard to the operable registry relation of the inner globe's equator 160 with the first indicia, the equator, buoyantly biased in the horizontal position, will lie in registry with the outer ends of the X axis located on the front face of the body about the outer globe and/or the X axis located on the front face of the outer globe when the at least one longitudinal surface of the level is positioned adjacent to the horizontal surface or line in question. The equator, again buoyantly biased in the horizontal position, will similarly lie in registry with the outer ends of the Y axis located on the front face of the body about the outer globe and/or the Y axis located on the front face of the outer globe when the at least one longitudinal surface is positioned along a vertical surface or line in question. Of course, if a given line or surface in question deviates from the horizontal or vertical, the equator will lie in registry with the optional indexed angle and/or pitch values of the quadrants to indicate the degree and/or pitch of the deviation.

The inner globe also includes a polar marking concentrically centered within the outer periphery of the upper hemisphere defined by the equator, with the marking in operable registry relation with a second indicia to indicate a position of the front face of the body in relation to a surface in question located adjacent to the front face. Although the polar marking may comprises a solid circle, the polar marking may comprise a cross-hair or other marking as well. The second indicia preferably comprises a circle and/or cross-hair concentrically located on the rear face of the outer globe and may optionally include index lines or gradations to allow a user to determine a percent of grade or elevation. In other embodiments of the invention, the polar marking of the inner globe is in operable registry relation with the first indicia (i.e., the X and Y axes located on the front face of the outer globe) to indicate a position of the rear face of the body in relation to a surface in question located adjacent to the rear face.

BRIEF DESCRIPTION OF THE DRAWINGS

FIG. 21 is a plan view of the front of one embodiment of the level verifying a planar surface in question along at least two directions.

DESCRIPTION OF THE EMBODIMENTS

Figure 1:
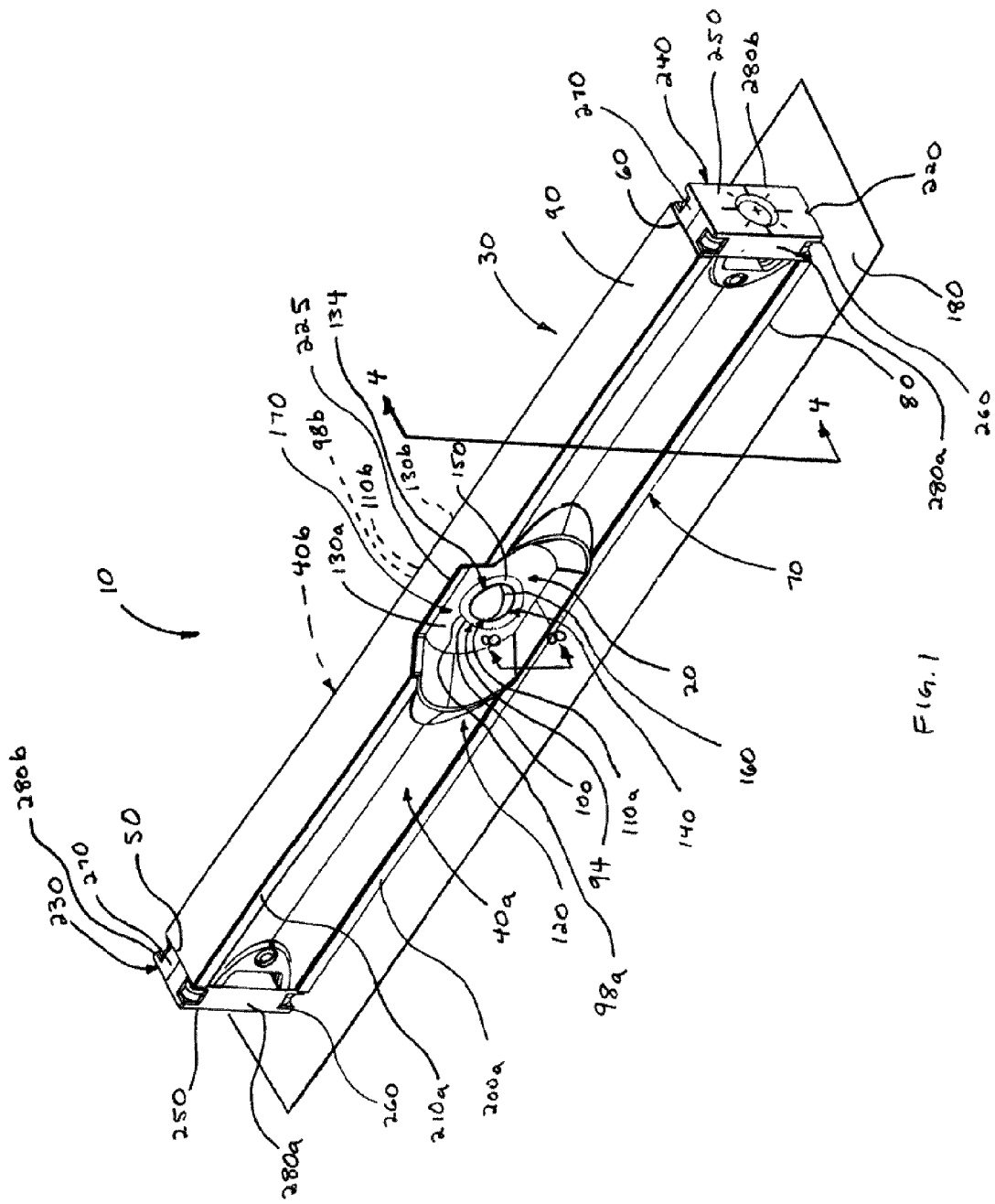
FIG. 1 is a perspective view of the front of one embodiment of the level.
Figure 2:
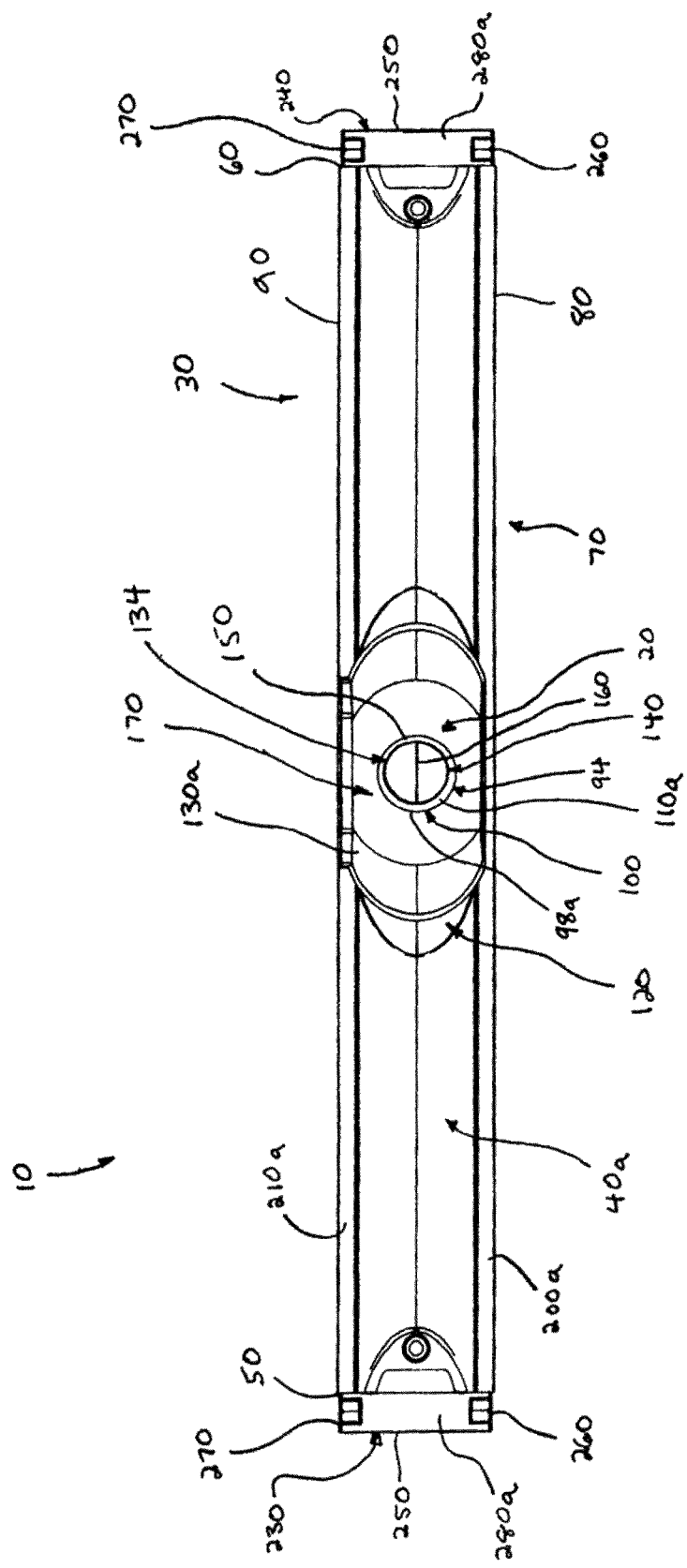
FIG. 2 is an elevation view of the front of the level of FIG. 1.
Figure 3:
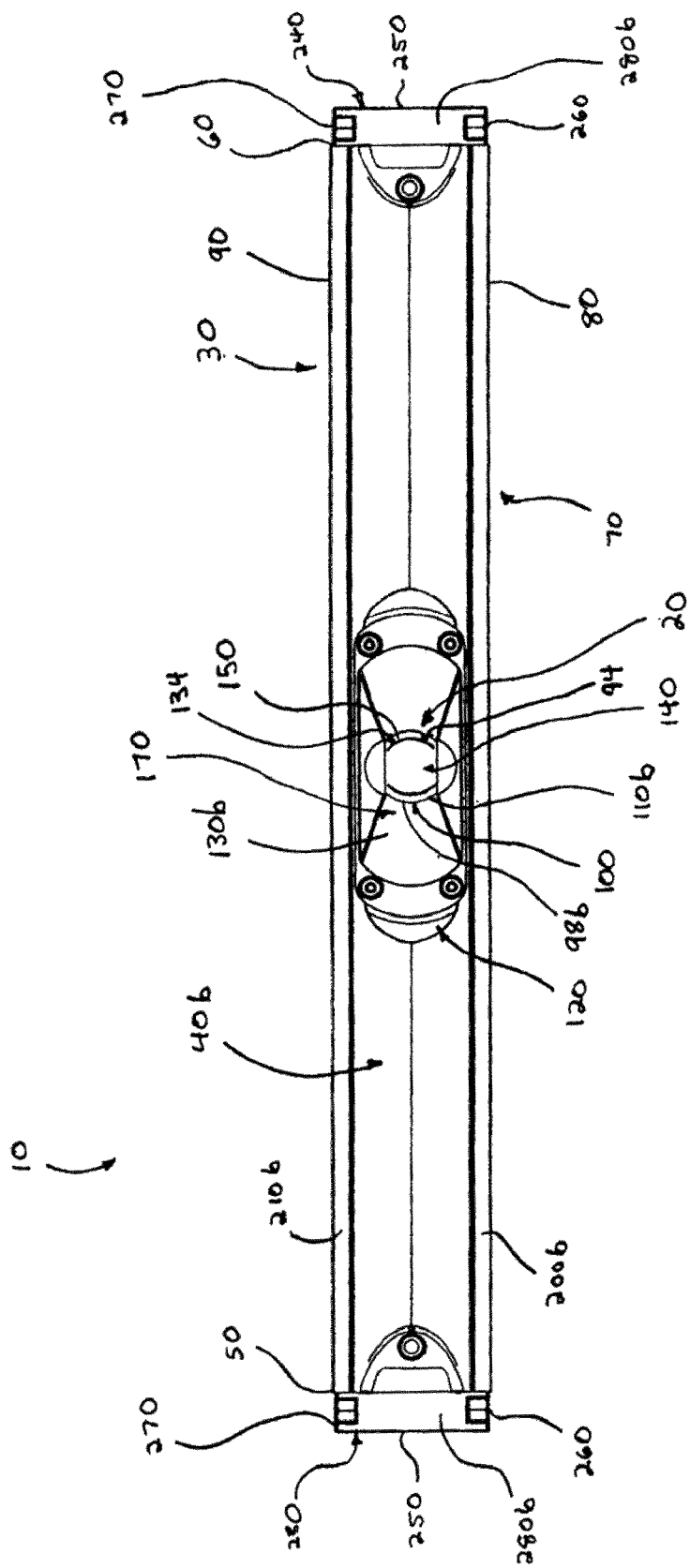
FIG. 3 is a plan view of rear of one embodiment of the level.

Referring initially to FIGS. 1-3, the level 10 comprises at least one indicator 20 located on a body 30. The body defines front and rear faces 40a and 40b, a pair of opposing ends 50 and 60, and at least one longitudinal surface 70, preferably lower and upper longitudinal surfaces 80 and 90. Although the figures illustrate the body 30 as being elongated, it is understood that the body may be non-elongated as well. For example, the at least one longitudinal surface 70 may have a length dimension equal to or less than the height dimension defined by the opposing ends. An outer vessel 94 of the at least one indicator is located at least partially between the front and rear faces of the body to define front and rear outer vessel faces 98a and 98b. In the preferred embodiments illustrated herein, the outer vessel defines a spherical outer globe 100 of the at least one indicator located at least partially between the front and rear faces of the body to define front and rear outer globe faces 110a and 110b. In other embodiments, the outer vessel may define a cube, truncated cube or rhombicuboctahedron defining front and rear cube faces, or other geometric shapes defining front and rear faces as understood in the art. Any of the foregoing geometric shapes may optionally have outwardly-acuate sides or faces as well. The front and rear faces of the body optionally include a bezel's 120 front and rear faces 130a and 130b, with the bezel securing the outer vessel (i.e., outer globe) at least partially between the front and rear faces of the body.

An inner vessel 134 of the at least one indicator is located within the outer vessel 94. The inner vessel, viewable through the outer vessel and defining an equator 160 around its outer periphery, is buoyantly biased to maintain the equator in a substantially horizontal position. The inner vessel may be buoyantly supported within the outer vessel via a liquid or via a mechanical means, to be further discussed. The equator is in operable registry relation with a first indicia 170 to indicate a position of the at least one longitudinal surface of the body in relation to a surface or line in question 180 located adjacent to the at least one longitudinal surface.

Embodiments of the inner vessel 134 may define an ovular sphere, spherical cone, any variation of dipyramid, bipyramid or deltahedron, or any other geometric form understood in the art capable of maintaining a buoyant position. However, in preferred embodiments, the inner vessel 134 of the at least one indicator comprises a substantially spherical inner globe 140, with the inner globe located within the outer globe 140 and supported by liquid 150 located within the outer globe. The inner globe, viewable through both the liquid and the outer globe and again defining an equator 160 around its outer periphery, is buoyantly biased within the liquid to maintain the equator in a substantially horizontal position. In other embodiments, the substantially spherical inner globe 140 is located within the outer globe and is supported by mechanical means located there-between, with the inner globe again viewable through the outer globe, defining an equator 160 around its outer periphery, and buoyantly biased to maintain the equator in a substantially horizontal position. For example, the mechanical means may comprise one or more ball bearings located between the inner and outer globes to buoyantly support the inner globe therein. In yet further embodiments, the inner globe 140 is located within the outer vessel 94 defining a cube or other geometric shape and is again supported by liquid 150 located within the outer vessel. The inner globe, viewable through both the liquid and the outer vessel and again defining an equator 160 around its outer periphery, is buoyantly biased within the liquid to maintain the equator in a substantially horizontal position.

Figure 4:
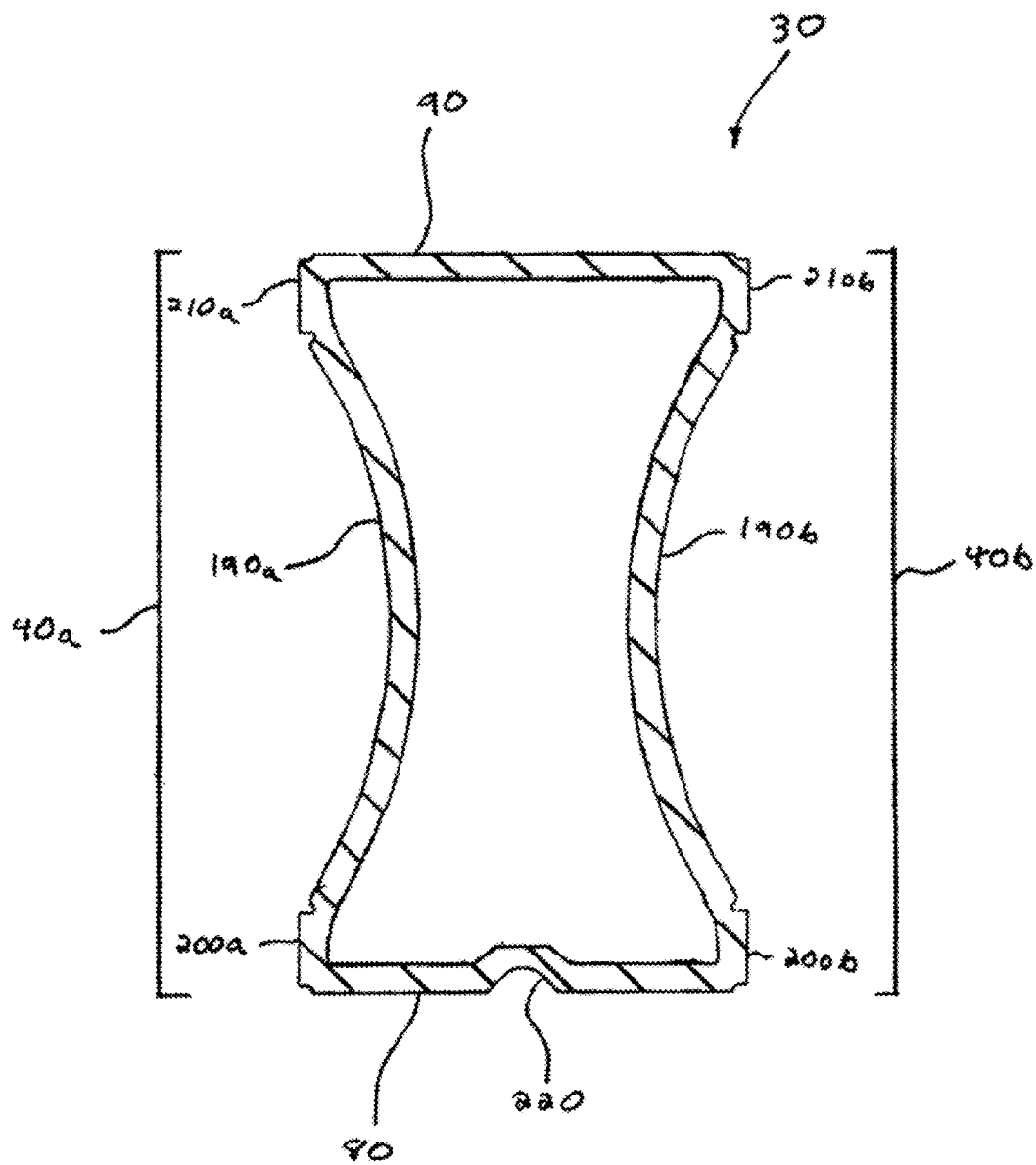
FIG. 4 is section view of the one embodiment of the body of the level of FIG. 1.

As illustrated in FIG. 4, the lower and upper longitudinal surfaces 80 and 90 and front and rear faces 40*a* and 40*b* of the level's body 30 define an arcuate, "I" shaped cross-section, with the faces comprising recessed, inwardly-arcuate center portions 190*a* and 190*b* located between lower and upper outer portions 200*a*, 210*a* and 200*b*, 210*b*, respectively, defined by edges of the lower and upper longitudinal surfaces. Although the center portions of the front and rear faces each define inwardly-arcuate recessed portions located between the lower and upper outer portions to define the arcuate "I" shaped cross-section of the body, it is understood that the center portions may be non-arcuate recessed portions to define a non-arcuate "I" shaped cross-section as well. It is further understood that the center portions may be non-recessed and co-planar with the lower and upper outer portions such that the front and rear faces define a body having a rectangular cross section as well. It is yet further understood that, regardless of the cross-sectional shape of the level's body, the outer vessel (i.e., globe), in being located at least partially between the front and rear faces of the body, may be located fully between the front and rear faces as well.

The lower and upper portions 200*a*, 210*a* and 200*b*, 210*b* of the respective front and rear faces 40*a* and 40*b* each preferably define planar surfaces, with the lower and upper portions common to a given face lying co-planar with one another. The co-planar lower and upper portions of a given face are thus adapted for contact with a given planar surface in question, with the co-planar surfaces of a front or rear face located adjacent to the given surface in question. The lower and upper longitudinal surfaces 80 and 90 of the at least one longitudinal surface 70 each preferably define planar surfaces oriented perpendicular to the front and rear faces 40*a* and 40*b* of the body 30, with the surfaces perpendicular to the their respective edges defining the lower and upper portions of the front and rear faces. The lower and upper longitudinal surfaces are each adapted for contact with a given planar surface in question to be referenced by the level, with the planar surface of an upper or lower surface located adjacent to the given surface in question.

A lengthwise groove 220 may be defined in either or both of the lower and upper longitudinal surfaces 80 and 90 of the at least one longitudinal surface 70, with at least FIGS. 1 and 4 illustrating the groove defined in the lower longitudinal surface of the body, by example. The lengthwise groove is adapted for contact with the edge of a given planar surface in question and/or the outer surface of a round member, such as a pipe, to be referenced by the level. A lengthwise cutout 225 may also be defined in either or both of the lower and upper longitudinal surfaces, centrally disposed below or above, respectively, the front outer globe face 110*a*, with at least FIG. 1 illustrating the cutout defined in the upper longitudinal surface of the body, by example. The cutout allows a user of the level to more easily view the front face of the globe when looking downwardly at the front face 40*a* of the level.

Although the figures illustrate a body 30 defining both lower and upper longitudinal surfaces, it is understood that other embodiments of the level 10 may utilize a body not having an upper surface and instead defining only the lower surface. It is further understood that the body may be non-elongated as well. For example, the at least one longitudinal surface 70 may have a length dimension equal to or less than the height dimension defined by the opposing ends, with the body having a shape approximating a cube or other shape, for example. Regardless of the foregoing construction of the body, it is preferably comprised of lightweight, rigid and non-conductive materials, such as plastic, aluminum and/or fiber-reinforced polymer materials. The body may be made via molding, extrusion, machining or other manufacturing processes known in the art. However, any material enabling at least the rigid properties of the body may be utilized as well.

As illustrated in FIGS. 1-3, optionally located at the opposite ends 50 and 60 of the body 30 are end caps 230 and 240. The end caps protect the ends of the level's body from impact damage if the level is inadvertently dropped by the user. The end caps each preferably define an outer end surface 250, lower and upper longitudinal surfaces 260 and 270, and front and rear facial surfaces 280*a* and 280*b*. In one embodiment, the lower and upper longitudinal surfaces of each cap are co-planar with the lower and upper longitudinal surfaces 80 and 90 of the body while the front and rear facial surfaces of each cap are co-planar with at least the lower and upper outer portions 200*a*, 210*a* and 200*b*, 210*b* of the body's front and rear faces 40*a* and 40*b*. In another embodiment, the lower and upper longitudinal surfaces of each cap are recessed from the lower and upper longitudinal surfaces 80 and 90 of the body while the front and rear facial surfaces of each cap are recessed from at least the lower and upper outer portions 200*a*, 210*a* and 200*b*, 210*b* of the body's front and rear faces 40*a* and 40*b* such that the surfaces of each end cap are located inwardly of the respective surfaces of the body. Because the utilization of end caps on the level is optional, it is understood that other embodiments of the level do not have end caps located at the level's opposing ends.

Figure 5:
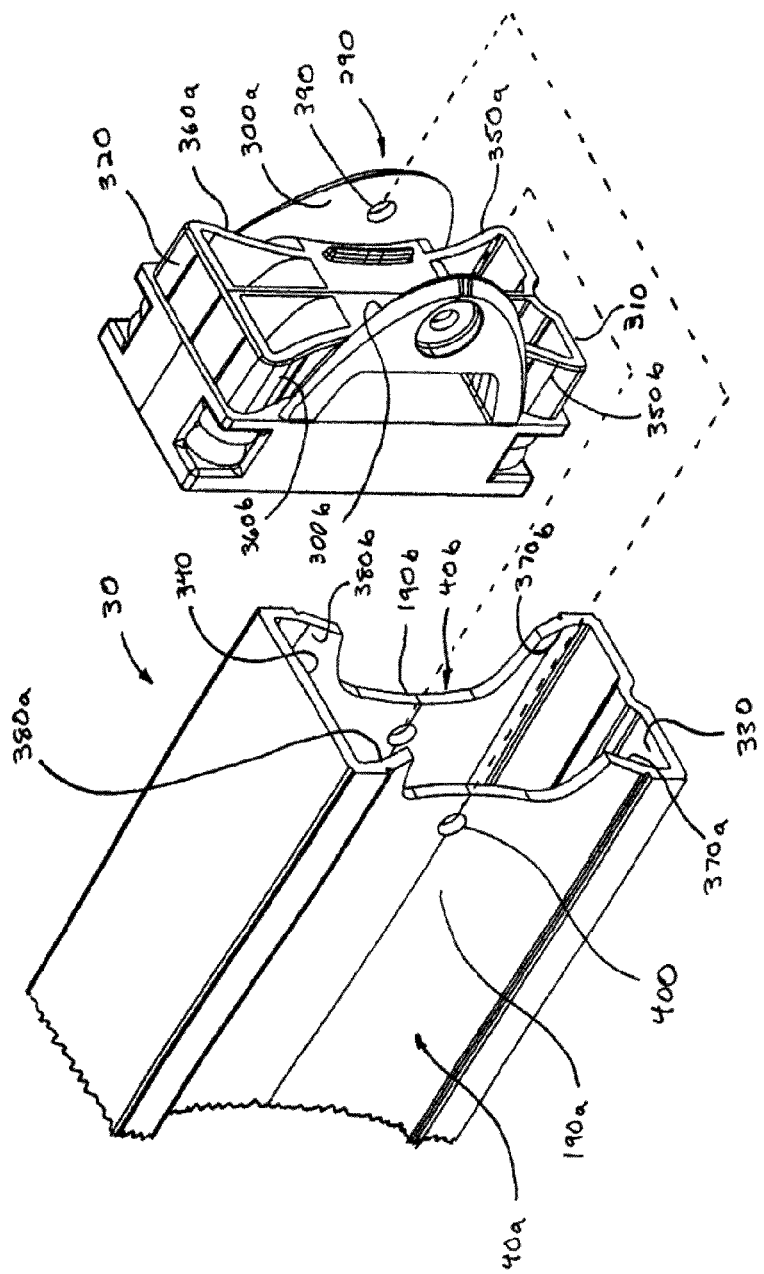
FIG. 5 is perspective assembly view of an end and end cap of the level.

Referring to FIG. 5, each end cap preferably includes an inner end 290 defining offset, inwardly-directed surfaces 300*a* and 300*b* adapted for contact with the center portions 190*a* and 190*b* of the front and rear faces 40*a* and 40*b* of the body 30, respectively. Each end cap also defines offset lower and upper outwardly-directed longitudinal surfaces 310 and 320, for contact with inner lower and upper longitudinal surfaces 330 and 340 of the body, respectively, as well as outwardly-directed lower and upper facial surfaces, 350*a*, 360*a* and 350*b*, 360*b*, for respective contact with inner facial surfaces 370*a*, 380*a* and 370*b*, 380*b* of the body. Each end cap preferably includes a transverse bore 390 defined through the inner ends of the halves. A transverse bore 400 is also preferably defined proximal to each end of the body, through the center portions of the front and rear faces, such that, when the bore of a cap is coaxially aligned with the bore located proximal to the given end of the body, the end cap may be secured to the body via a bolt, screw, rivet or other fastener fastened there-through. However, it is understood that other constructions of the end caps are possible, and further that the end caps may be secured to the outer ends of the body via adhesive or any other means understood in the art.

Figure 6:
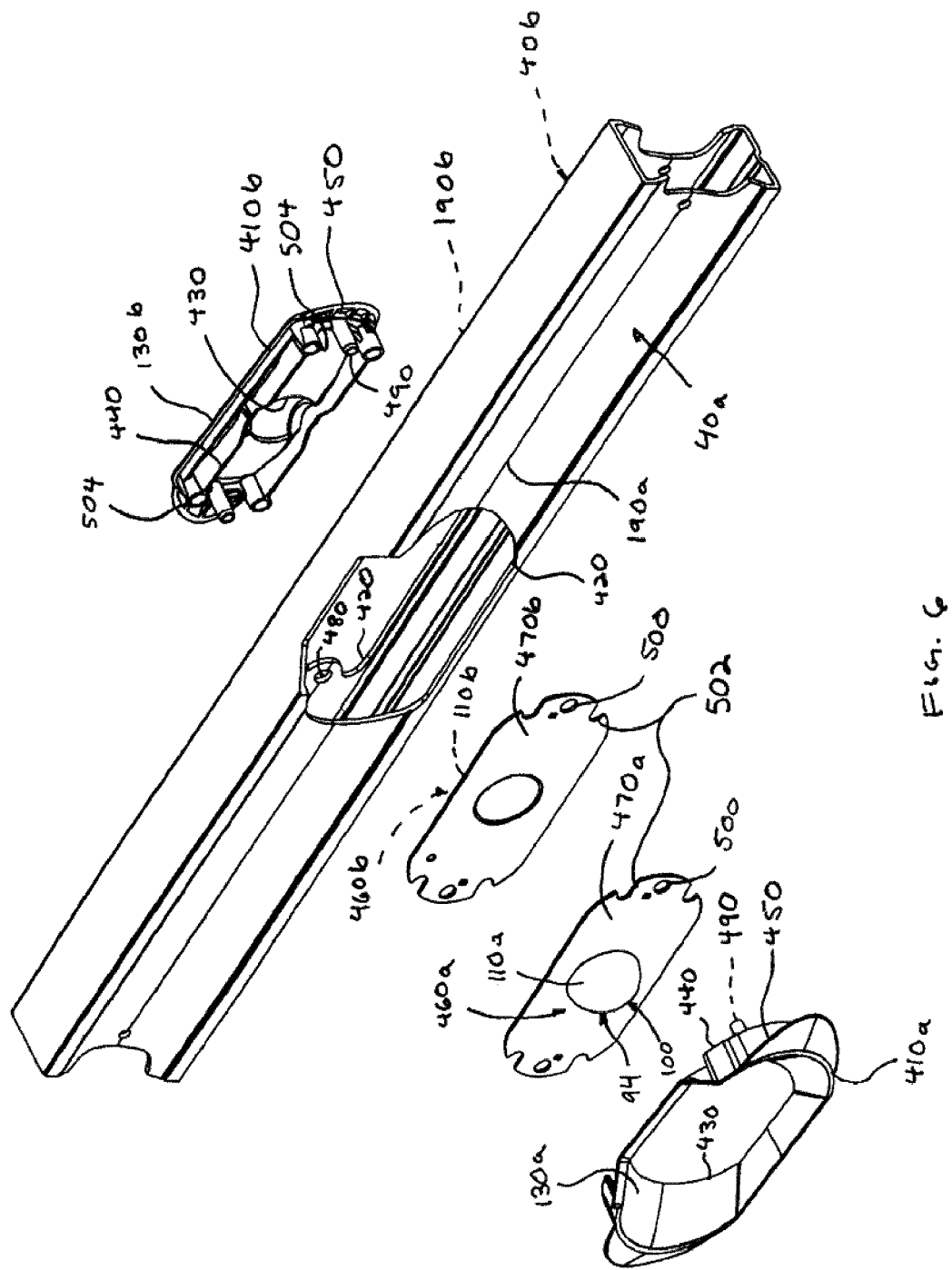
FIG. 6 is a perspective exploded view of one embodiment of the bezel, outer globe, flanges and body of the level.

As further illustrated in FIGS. 1-3 and 6-7, the front and rear faces 40*a* and 40*b* of the body 30 optionally include the front and rear faces 130*a* and 130*b* of the bezel 120 for securing the outer vessel 94 (i.e., globe 100) at least partially between the front and rear faces of the body. Referring to FIG. 6, the front and rear faces of the bezel are thus preferably defined by respective front and rear bezel brackets 410*a* and 410*b* adapted for securement with the center portions 190*a* and 190*b* of the respective front and rear faces of the body. To facilitate the securement of the front and rear bezel brackets to the center portions of the front and rear faces of the body, at least one transverse opening 420 is defined through the center portions of the body's front and rear faces while each bracket further optionally defines a central, transverse void 430, an inwardly directed globe engagement surface 440 located about the void and an off-set, inwardly-directed body engagement surface 450.

The inwardly-directed globe engagement surfaces 440 of the front and rear bezel brackets 410*a* and 410*b* are adapted to extend into the at least one transverse opening 420 defined though the central portions 190*a* and 190*b* of the body's front and rear faces 40*a* and 40*b* and contact respective front and rear outer globe flanges, to be further discussed. The off-set, inwardly-directed body engagement surfaces 450 of the front and rear bezel brackets are adapted for contact with the center portions of the respective front and rear faces of the body 30 about the transverse opening defined through the central portion of the body's front and rear faces.

The optional central void 430 of each bezel bracket 410*a* and 410*b*, adapted for transverse, coaxial alignment with one another, defines an inner diameter that is greater than the outer diameter or a predetermined chord segment of the spherical outer globe 100. The spherical outer globe, comprising front and rear outer globe halves 460*a* and 460*b* respectively defining the globe's front and rear faces 110*a* and 110*b*, includes respective front and rear peripheral outer globe flanges 470*a* and 470*b*. In one embodiment, the front and rear peripheral flanges are unitary with the respective front and rear outer globe halves and are adapted to sealingly engage one another such that the liquid is maintained within the interior of the outer globe. In other embodiments, the front and rear outer globe halves 110*a* and 110*b* sealingly engage one another without peripheral flanges (FIG. 9) to define the outer globe 100, with the outer globe thereafter being affixed to the peripheral outer flanges.

Thus, in securing the outer globe 100 at least partially between the front and rear faces 40*a* and 40*b* of the body 30 in one embodiment of the invention, the front and rear bezel brackets 410*a* and 410*b* are located adjacent to the center portions 190*a* and 190*b* of the respective front and rear faces of the body such that the off-set, inwardly-directed body engagement surfaces 450 of the front and rear bezel brackets contact the center portions of the respective front and rear faces of the body about the at least one transverse opening 420 of the body. In this location, the inwardly-directed globe engagement surfaces 440 of the front and rear bezel bracket extend into the at least one transverse opening of the body for contact with at least the respective front and rear outer globe flanges 470*a* and 470*b*. For embodiments not utilizing globe flanges, the engagement surfaces of the bezel brackets engage the front and rear outer globe halves directly. The front and rear globe halves 460*a* and 460*b* extend outwardly through the optional central voids 430 of the respective front and rear bezel brackets, while the front and rear globe flanges are "sandwiched" between the inwardly-directed globe engagement surfaces of the bezel brackets. At least the globe halves 460*a* and 460*b* are thus viewable through the optional central voids 430, with the globe flanges 470*a* and 470*b* thus optionally viewable through the central voids as well.

To maintain the front and rear bezel brackets 410*a* and 410*b* in the foregoing location, a pair of transverse bores 480 may be defined through the center portions 190*a* and 190*b* of the front and rear faces 40*a* and 40*b* of the body 30 such that the an opening of the at least one opening 420 of the body is located longitudinally between the bores. A pair of transverse bores 490 may thus be defined through the engagement surfaces 440 of the front and rear brackets 410*a* and 410*b* of the bezel 120 for respective coaxial alignment with the pair of bores of the body and a pair of bores 500 located in the peripheral flanges of the outer globe halves 460*a* and 460*b*, such that the bezel brackets may be secured to the body, with the flanges or globe halves secured there-between, via a pair of bolts screws, rivets or other fasteners fastened there-through. As further illustrated in FIGS. 6 and 7, inlets 502 are defined within the peripheral flanges 470*a* and 470*b* that are axially aligned with bores 504 defined within the engagement surfaces 440 of the rear bezel bracket 410*b* to facilitate a further securement of the components to one another via additional fasteners as understood in the art. The inlets 502 and bores 504 may optionally facilitate an adjustable connection between both flanges 470*a* and 470*b* and the rear bezel bracket 410*b* as well, to be further discussed.

Figure 7:
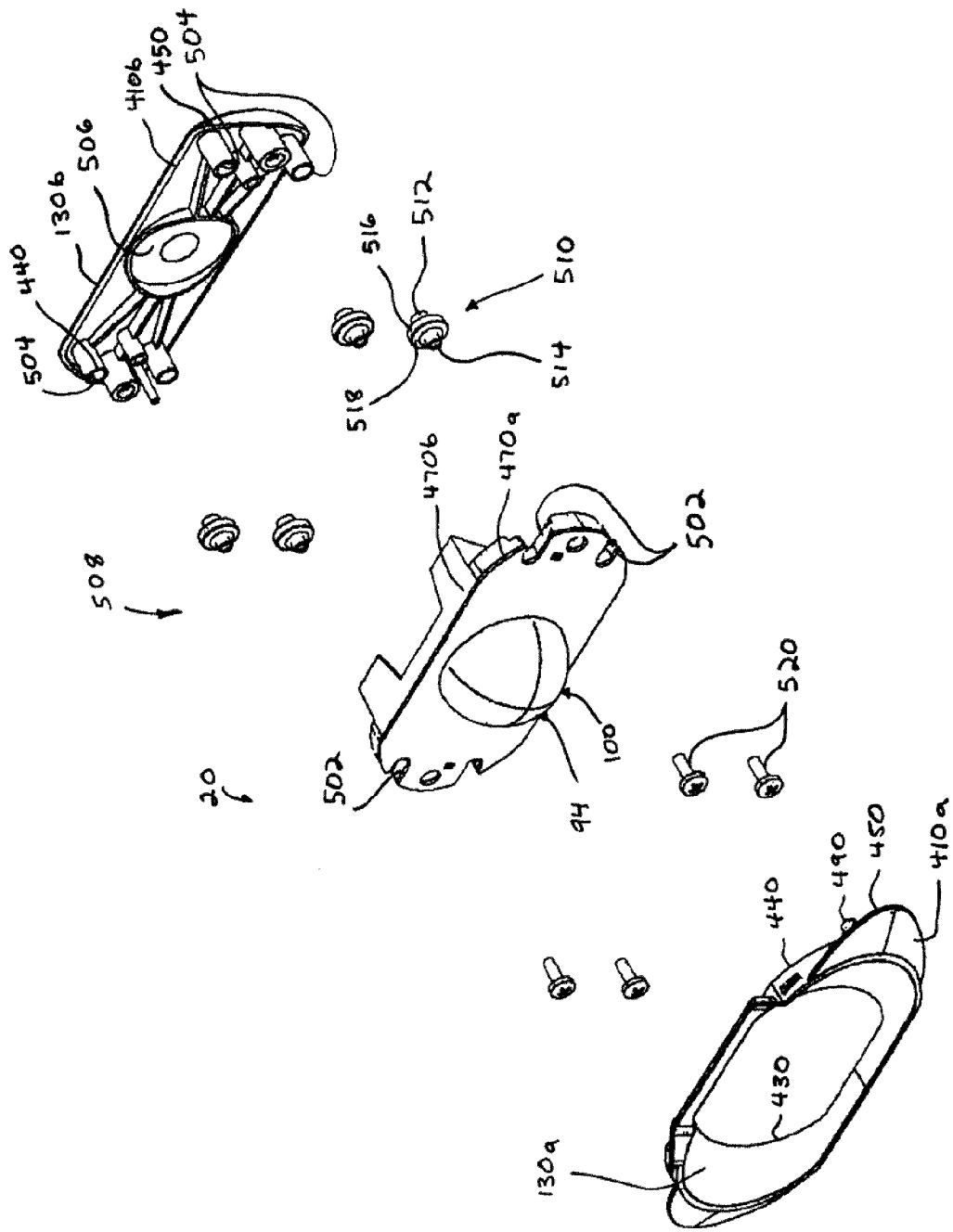
FIG. 7 is a perspective exploded view of another embodiment of the bezel, outer globe, flanges and body of the level.

It is understood, however, that other constructions of the bezel brackets are possible, and further that the bezel brackets may be secured to the body via adhesive or any other means understood in the art. For example, in other constructions of the bezel brackets 410*a* and 410*b*, either or both brackets may be constructed without the central void 430 such that either or both of the front and rear vessel halves 98*a* and 98*b* (i.e., globe halves 460*a* and 460*b*) do not extend outwardly there-through. In such constructions, one or more of the bezel brackets may thus obscure the view of one of the globe halves and/or flanges 470 *a* and 470*b* such that only one half and/or flange (i.e., only the front or rear half and/or flange) is visible, or either or both brackets omitting the void may be constructed entirely or partially of transparent or translucent material such that either or both globe halves and/or flanges are visible there-through. FIG. 7 thus illustrates an embodiment having the rear bezel bracket 410*b* constructed without the central void 430 such that the rear vessel half 98*b* (i.e., rear globe half 460*b*) does not extend outwardly there-through. In this embodiment, the rear bezel bracket has a panel 506 in place of the void 430 that obscures the view of the rear vessel half (i.e., rear globe half) and rear flanges 470*b* such that only the front half and flange is visible. Of course, the panel 506 may be constructed of transparent or translucent material to facilitate a view of the rear globe and flanges there-through as well.

FIG. 7 also illustrates an adjustment mechanism 508 for the at least one indicator 20. The adjustment mechanism allows a manufacturer to rotate the indicator about approximate horizontal and vertical axes, as defined by the level resting on its lower surface with a user viewing the level's front face, to adjust for manufacturing tolerances and ensure that the indicator is true in relation to the level's body 30. The adjustment mechanism is preferably comprised of a plurality of adjustable fittings 510 located about the outer globe and adjustably connecting the front and rear flanges 470*a* and 470*b* together to the rear bezel 410*b*. The fittings are preferably symmetrically located about the top right, bottom right, top left and bottom left of the outer globe 100. Each fitting, facilitating a depth adjustment of the flanges in relation to the rear bezel, is comprised of a post 512 defining a threaded socket 514 within an outer end thereof and a nut 516 threadedly engaged about the outer end of the post, with the nut defining an outer face 518. The post of each fitting is affixed within the socket 504 of the rear bezel 410*b*, the front face of each nut abuts the rear flange 470*b* of the flanges, and the threaded socket of the post is in axial alignment with each inlet 502 defined through the flanges. Screws 520, respectively driven through each inlet of the flanges and into the threaded socket of each post, adjustably secure the flanges to the fittings and thus the rear bezel.

A depth adjustment of each fitting is thus accomplished via a rotation of each nut (i.e., of the four nuts abutting the rear flange of the flanges of the indicator) inwardly or outwardly. The inwardly or outwardly rotation of the respective nuts thus results in an inwardly or outwardly movement of the flanges of the indicator. For example, if the top two nuts are rotated outwardly and the bottom two nuts are rotated inwardly, the indicator, via the flange abutting the nuts, is adjusted such that it rotates about a horizontal axis. If the top and bottom right-side nuts are rotated outwardly and the top and bottom left-side nuts are rotated inwardly, the indicator, via the flange abutting the nuts, is adjusted such that it rotates about a vertical axis. Of course, the nuts may be rotated inwardly or outwardly in various combinations to facilitate an adjustment of the indicator in various directions.

Figure 8:
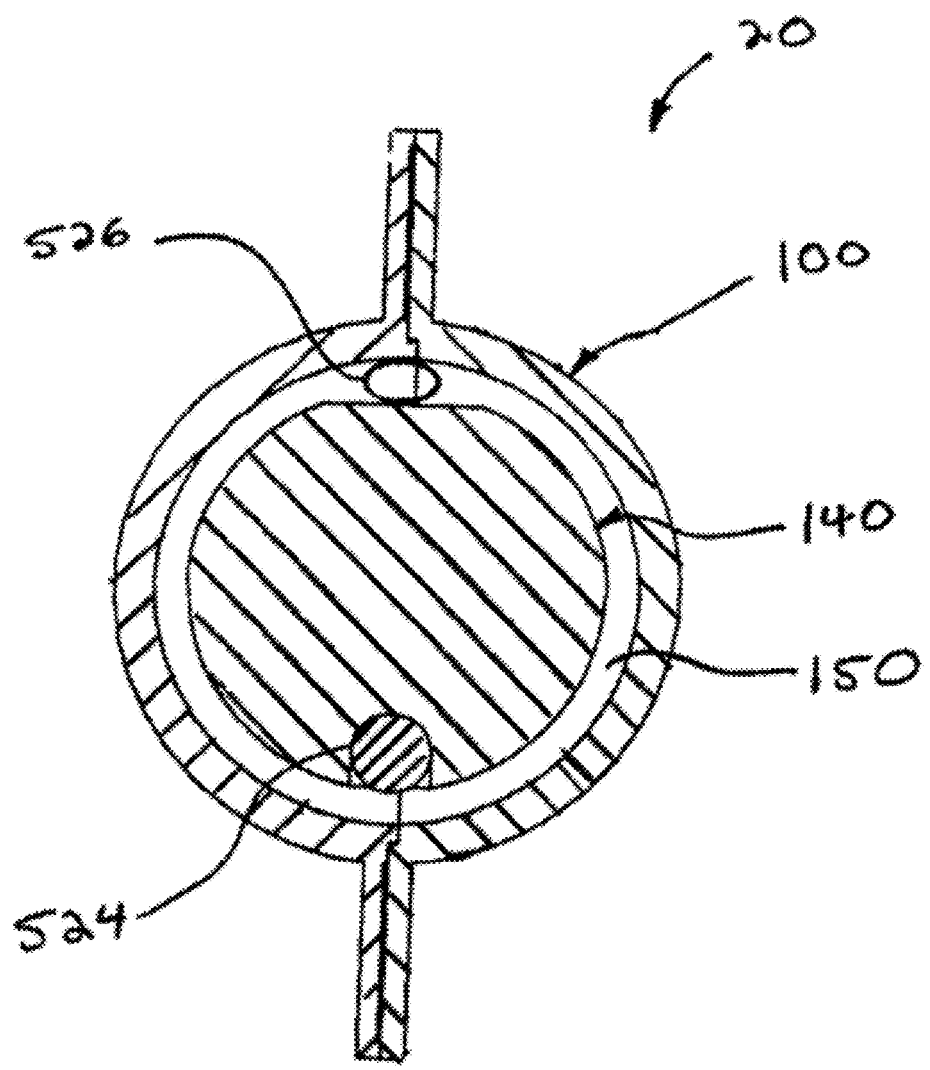
FIG. 8 is a sectional view of one embodiment of the inner and outer globes of FIG. 1.

To allow the inner vessel 134 (i.e., globe 140) to be viewable through the outer vessel 94 (i.e., globe 100), the front and rear halves 98a and 98b of the outer vessel (i.e. front and rear halves 460a and 460b of the outer globe) are comprised of transparent or translucent plastic or glass. The liquid 150, optionally located within the outer globe and substantially surrounding the inner globe, is also transparent or translucent to allow the inner globe to be viewable there-through. The liquid is preferably comprised of alcohol, mineral oil or other oils, or any other temperature-stable substance that facilitates the buoyant properties of the inner globe. As illustrated in FIG. 8, which shows a cross-section of the inner and outer globes 100 and 140 of the indicator 20 of FIG. 1, the inner globe may thus be hollow and filled with a gas, and/or partially solid or solid and comprised of a material (i.e., plastic, cork, wood, etc.) tending to float within the liquid 150. To enable its buoyant properties, the inner globe includes a weight 524, located proximal to an outer periphery thereof, to both define a bottom of the globe and maintain the globe in an "upright" position within the liquid of the outer globe. A bearing 526, such as a gas bubble, may be located between the inner and outer globes, proximal to a top of the inner globe, to minimize frictional contact between the two. The outer globe 100 has a diameter of at least about 10 millimeters (mm), preferably from about 12.5 millimeters (mm) to about 89 millimeters (mm), and more preferably about 48 millimeters (mm). The inner globe 140 has a diameter of at least about 6 millimeters (mm), preferably from about 8.5 millimeters (mm) to about 81 millimeters (mm), and more preferably about 40 millimeters (mm). It is understood, however, that inner and outer globe diameters of any dimension may be utilized.

Figure 9:
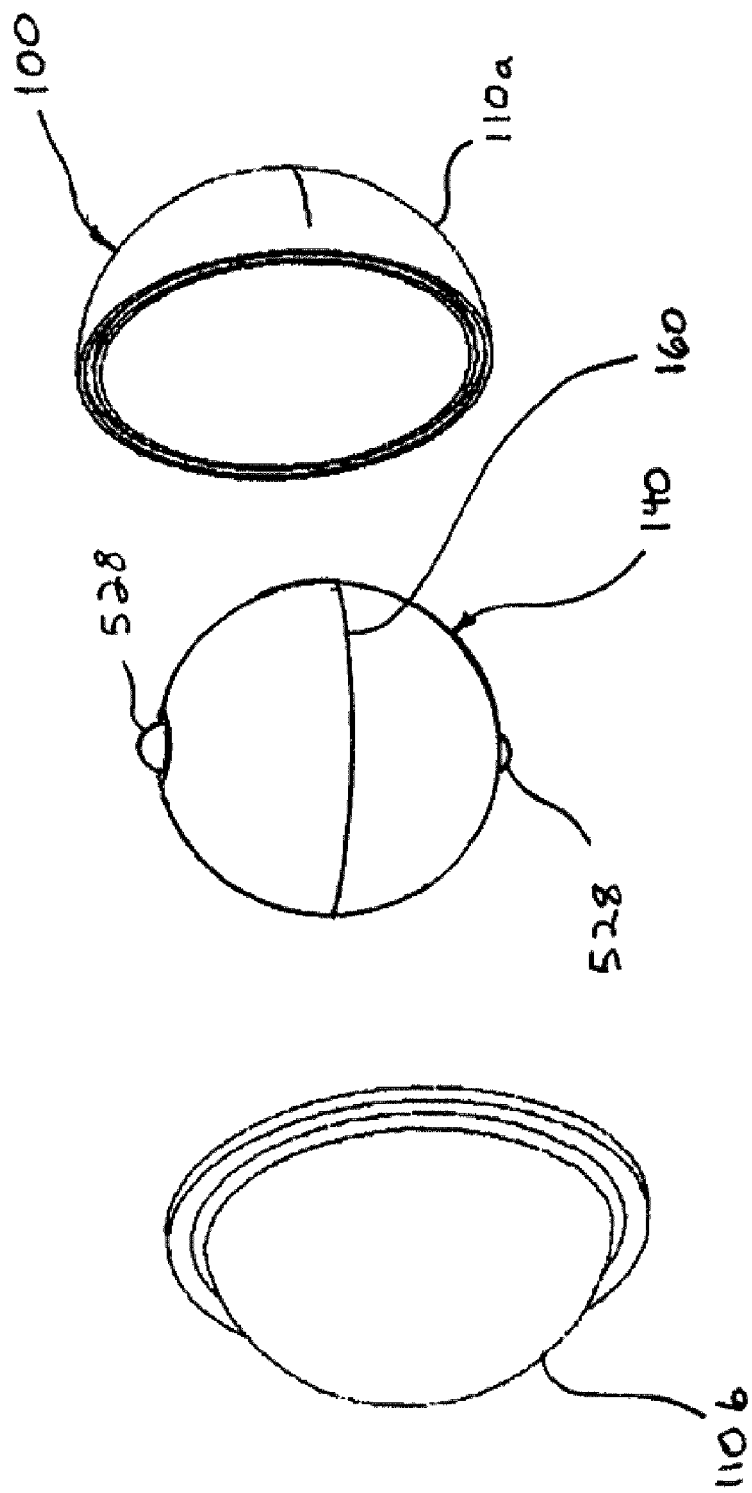
FIG. 9 is a perspective exploded view of another embodiment of the inner and outer globes of FIG. 1.

Referring to FIG. 9, in yet a further embodiment, the substantially spherical inner globe 140 is located within the outer globe 100 and is supported by a mechanical means located there-between, with the inner globe again viewable through the outer globe, defining an equator 160 around its outer periphery, and buoyantly biased within to maintain the equator in a substantially horizontal position. For example, the mechanical means may comprise one or more ball bearings 528 located between the inner and outer globes to buoyantly support the inner globe therein. In the embodiment illustrated in FIG. 9, the one or more ball bearings 528 are located at the top and bottom of the inner globe 140 to buoyantly support it within the outer globe 100. It is understood, however, that additional ball bearing may be located at other areas of the inner globe, such as about the equator, to further support the inner globe within the outer globe.

Figure 10:
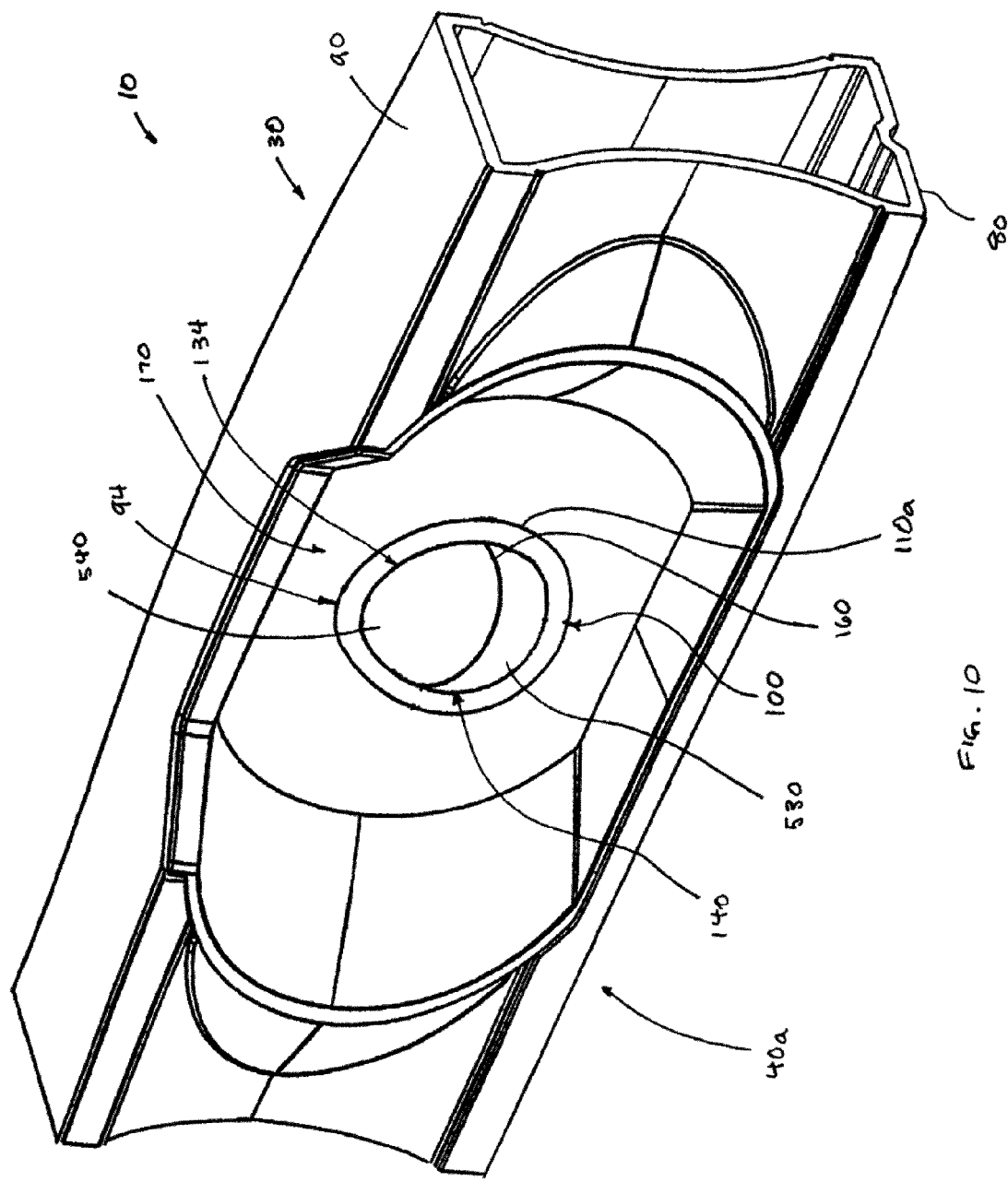
FIG. 10 is a close-up perspective view of the front face and equator of the level.

FIGS. 10-13 illustrate close-up elevation views of the front face 40a of the level 10 resting on its lower longitudinal surface 80. Referring initially to FIG. 10, the inner globe 140 includes the equator 160 defined around its outer periphery that divides the inner globe into equal and symmetrical lower and upper hemispheres 530 and 540. In the illustrated embodiment, the equator is defined by a line drawn around the globe's outer periphery, with the lower and upper hemisphere having a common color. However, in other embodiments not illustrated herein, the equator of the inner globe is defined by respective contrasting colors (i.e., black and white) of the globe's lower and upper hemispheres. Regardless of how the equator is defined on the inner globe, it is in operable registry relation with the first indicia 170 to indicate a position of the at least one longitudinal surface of the body in relation to the adjacent surface or line in question.

Figure 11:
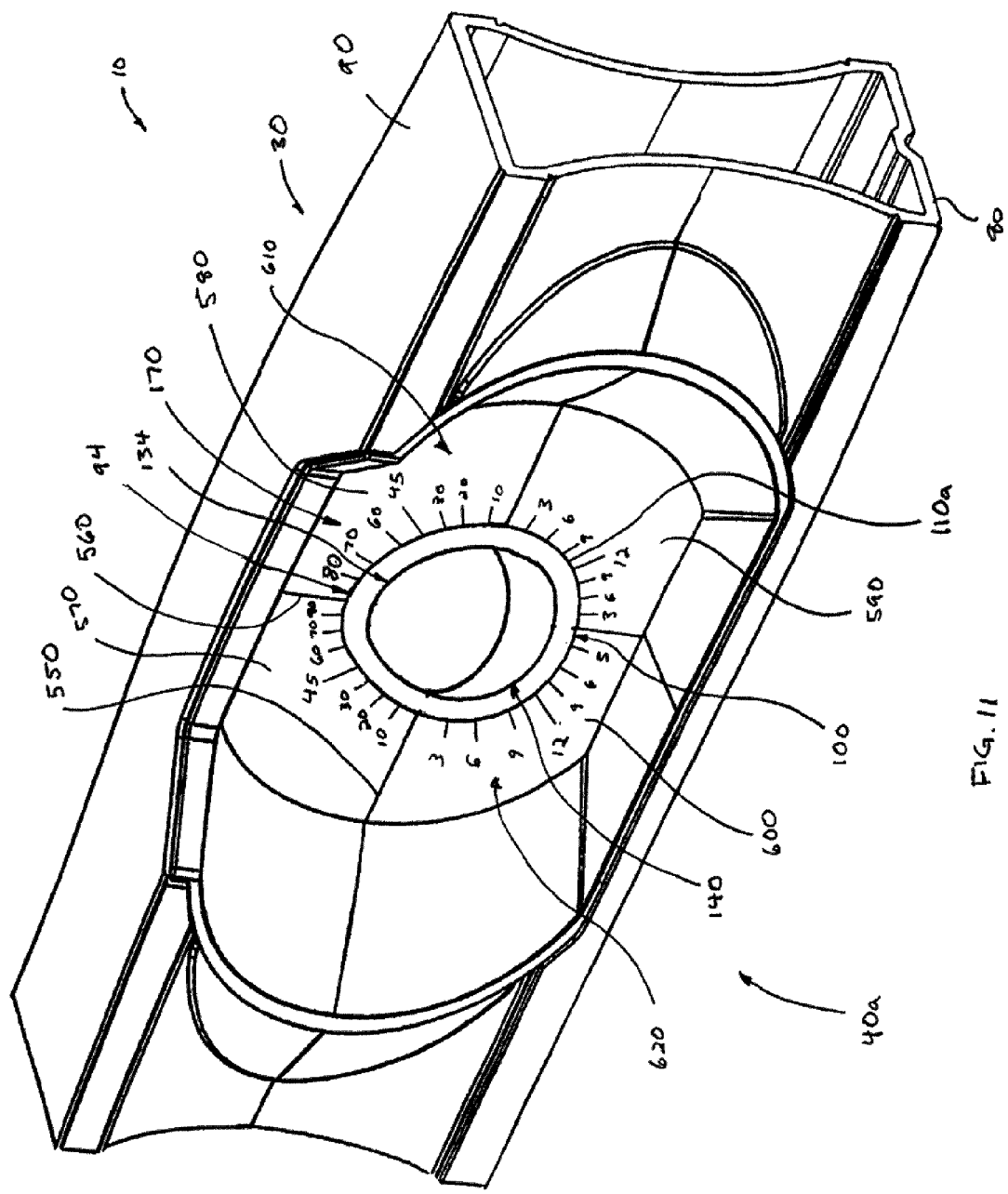
FIG. 11 is a close-up perspective view of the front face, equator and a first indicia of the level.
Figure 12:
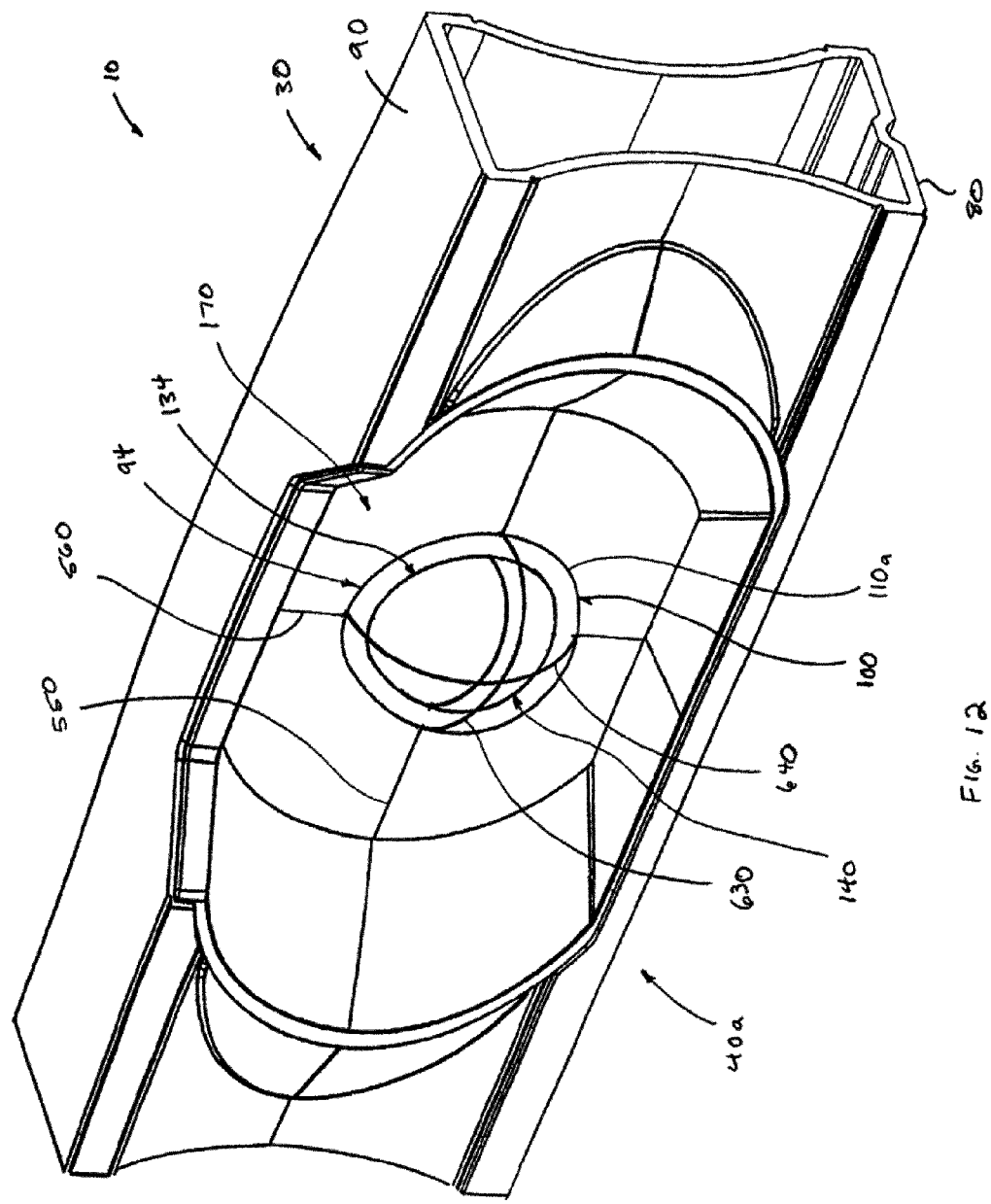
FIG. 12 is a close-up perspective view of the front face, equator and an alternate first indicia of the level.
Figure 13:
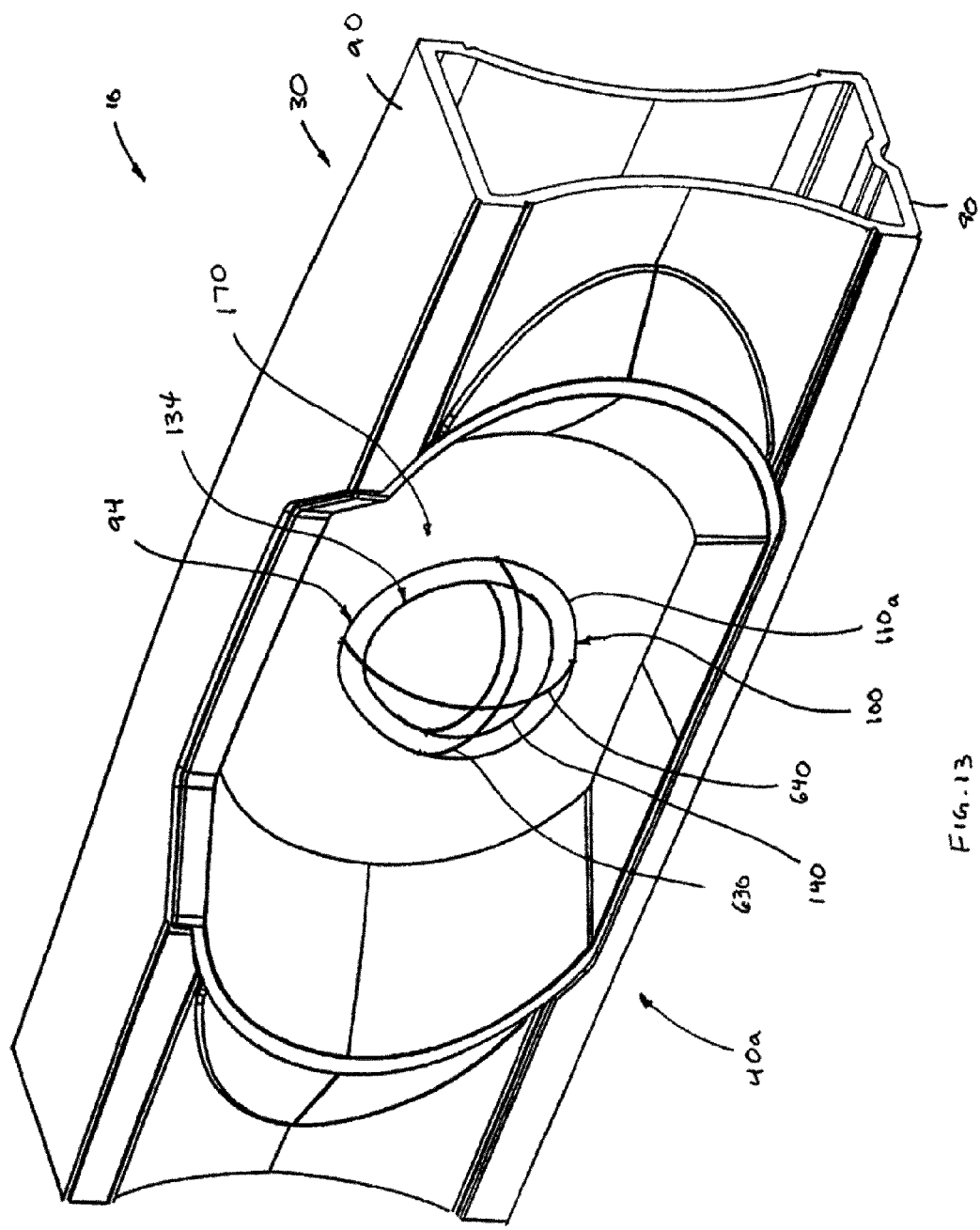
FIG. 13 is a close-up perspective view of the front face, equator and another alternate first indicia of the level.

As best illustrated in the embodiment of FIG. 11, the first indicia 170 comprises X and Y axes intersecting one another at 90 degrees, with the outer ends 550 and 560 of the axes located on the front face 40a of the level about the outer vessel 94 (i.e., globe 100) of the indicator to define four quadrants 570, 580, 590 and 600. The X and Y axes and quadrants of the first indicia located about the outer globe may thus be located on the body 30 of the level, on one or more of the level's bezels 130a and 130b, on one or more of the outer globe's flanges 470a and 470b, or between the outer globe's flanges. For example, where the X and Y axes and quadrants of the first indicia are located between the front and rear flanges, the flanges are transparent or translucent and have an illustration of the axes and quadrants thereon sandwiched there-between such that the illustration is viewable through at least one of the flanges (i.e., through the front flange). Assuming a horizontal orientation of the longitudinal, elongated body 30, the lines of the X and Y axes define horizontal and vertical reference lines, with the horizontal X axis lying parallel to the lower and upper longitudinal surfaces 80 and 90 of body and the vertical Y axis lying perpendicular to the X axis and the body's lower and upper longitudinal surfaces. Where the X and Y axes and quadrants of the first indicia are located on or between the globe's flanges, an adjustment of the optional adjustment mechanism 508, as previously discussed herein in relation to FIG. 7, ensures that the quadrant and axes are also true in relation to the level's body.

The quadrants of the first indicia discussed above may optionally include markings 610 and 620 indicating indexed angle and/or pitch values, respectively. The angle values preferably define a range of from about 0 to about 90 degrees of inclination or declination, per quadrant, with about 45 degrees defining the quadrant's mid-point. The pitch values preferably define a range of from about 0 inches of rise per 12 inch run to about 12 inches of rise per 12 inch run, and back to about 0 inches of rise per 12 inch run, per quadrant, with about 12 inches of rise per 12 inch run comprising the quadrant's mid-point. In other embodiments, the pitch values define a range of from about 0 inches of rise per 12 inch run to about 40 inches of rise per 12 inch run, with about 12 inches of rise per 12 inch run again defining the mid-point. It is understood, however, that other combinations of angle and/or pitch markings may be utilized in other configurations as well. For example, the pitch marking may indicate 0, ⅛, ¼, ⅜ and ½ inch per foot measurements, common to plumbers, or other common measurements as well. It is also understood that the pitch values can read in metric denominations as well.

The four quadrants 570, 580, 590 and 600 of the first indicia 170 may optionally define two pairs of quadrants of contrasting color, with each quadrant of a common-color pair located diametrically opposite of one another. The quadrants of a one color may be utilized when determining the degrees of inclination and/or pitch of a given line or surface from the horizontal while quadrants of the contrasting color may be utilized in determining the degrees of inclination and/or pitch of a given line or surface from the vertical.

The first indicia 170, may additionally (FIG. 12) or alternatively (FIG. 13) include a horizontal circumferal equator 630 and a vertical circumferal line 640, preferably located on the front face 110a of the outer globe 100, that intersect one another at 90 degrees. The circumferal equator and vertical circumferal lines define X and Y axes on the front face of the outer globe that, in turn, define horizontal and vertical reference lines. In defining horizontal and vertical reference lines, the outer globe's horizontal X axis again lies parallel to the lower and upper longitudinal surfaces 80 and 90 of the body 30 while its vertical Y axis again lies perpendicular to the X axis and the body's lower and upper longitudinal surfaces. If used in addition to the X and Y axes located on the front face of the body (FIG. 12), the X and Y axes of the outer globe are respectively aligned with the outer ends 550 and 560 of the X and Y located about the globe.

With regard to the operable registry relation of the inner globe's equator 160 with the first indicia 170, the equator, buoyantly biased in the horizontal position, will lie in registry with the outer ends 550 of the X axis located on the front face 40a of the body about the outer globe and/or the X axis 630 located on the front face 110a of the outer globe 100 when the at least one longitudinal surface 70 (i.e., a lower, or optionally upper, longitudinal surface 80 or 90) of the level is positioned adjacent to the horizontal surface or line in question 180. The equator, again buoyantly biased in the horizontal position, will similarly lie in registry with the outer ends 560 of the Y axis located on the front face of the body about the outer globe and/or the Y axis 640 located on the front face of the outer globe when the at least one longitudinal surface is positioned along a vertical surface or line in question. Of course, if a given line or surface in question deviates from the horizontal or vertical, the equator will lie in registry with the optional indexed angle and/or pitch values 610 and/or 620 of the quadrants to indicate the degree and/or pitch of the deviation.

Figure 14:
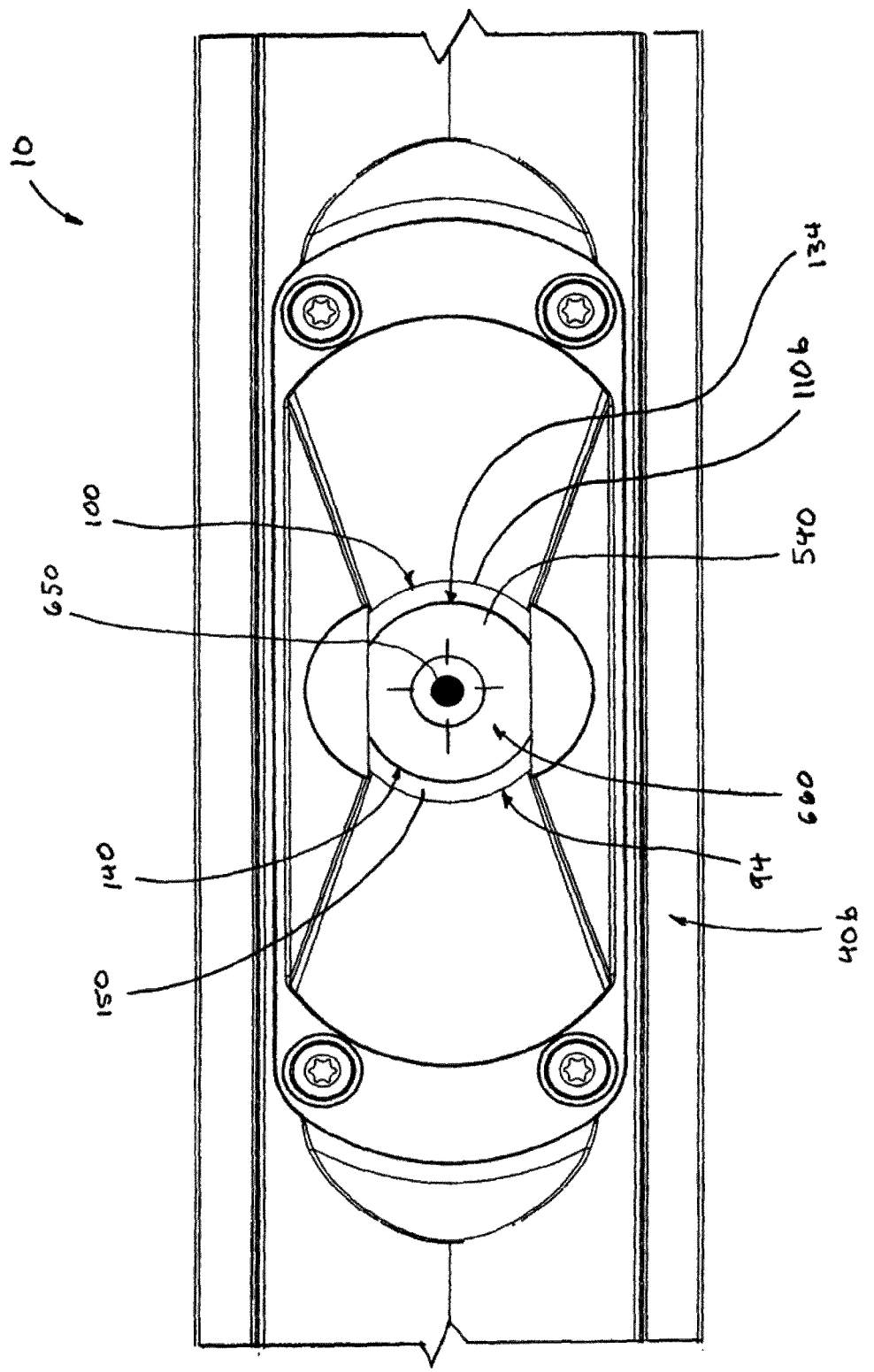
FIG. 14 is a close-up plan view of the rear face, polar marking and second indicia of the level.

FIG. 14 is a close-up plan view of the rear face 40b of the level 10 illustrating the level resting on its front face 40a such that the front face of the level is lying horizontally and facing downwardly (i.e., in a "face down" position) and the rear face of the level is lying horizontally and facing upwardly (i.e., in a "face up" position). For the sake better illustrating the inner globe, bearing 526 has been omitted for clarity. The inner globe 140 is suspended in the upright position within the liquid 150 of the outer globe 100 such that the inner globe's upper hemisphere 540 is facing upwardly and its lower hemisphere 530 is not visible because it is facing downwardly. The inner globe includes a polar marking 650 concentrically centered within the outer periphery of the upper hemisphere defined by the equator, with the marking in operable registry relation with a second indicia 660 to indicate a position of the front face of the body in relation to a surface in question 180 located adjacent to the front face. Although the polar marking comprises a solid circle within FIG. 14, the polar marking may comprise a cross-hair or other marking as well.

The second indicia 660 preferably comprises a circle and/or cross-hair concentrically located on the rear face 110b of the outer globe 100, as viewed from the rear face 40b of the body. The cross-hair may optionally include index lines or gradations to allow a user to determine a percent of grade or elevation. Such index lines or gradations along one or both axes of the crosshair may indicate 0, ⅛, ¼, ⅜ and ½ inch per foot measurements, common to plumbers, or other common measurements as well. The second indicia of the outer globe, when used in operable registry relation with the polar marking 650 of the inner globe 140, allows for an indication and/or measurement of an angle of deviation of a surface in question from a horizontal plane in at least two directions. Thus, with regard to the operable registry relation of the inner globe's polar marking with the second indicia, the polar marking will lie in registry with the circle and/or cross-hair located on the rear face of the outer globe when the front face of the level is positioned along a horizontal surface in question.

Figure 15:
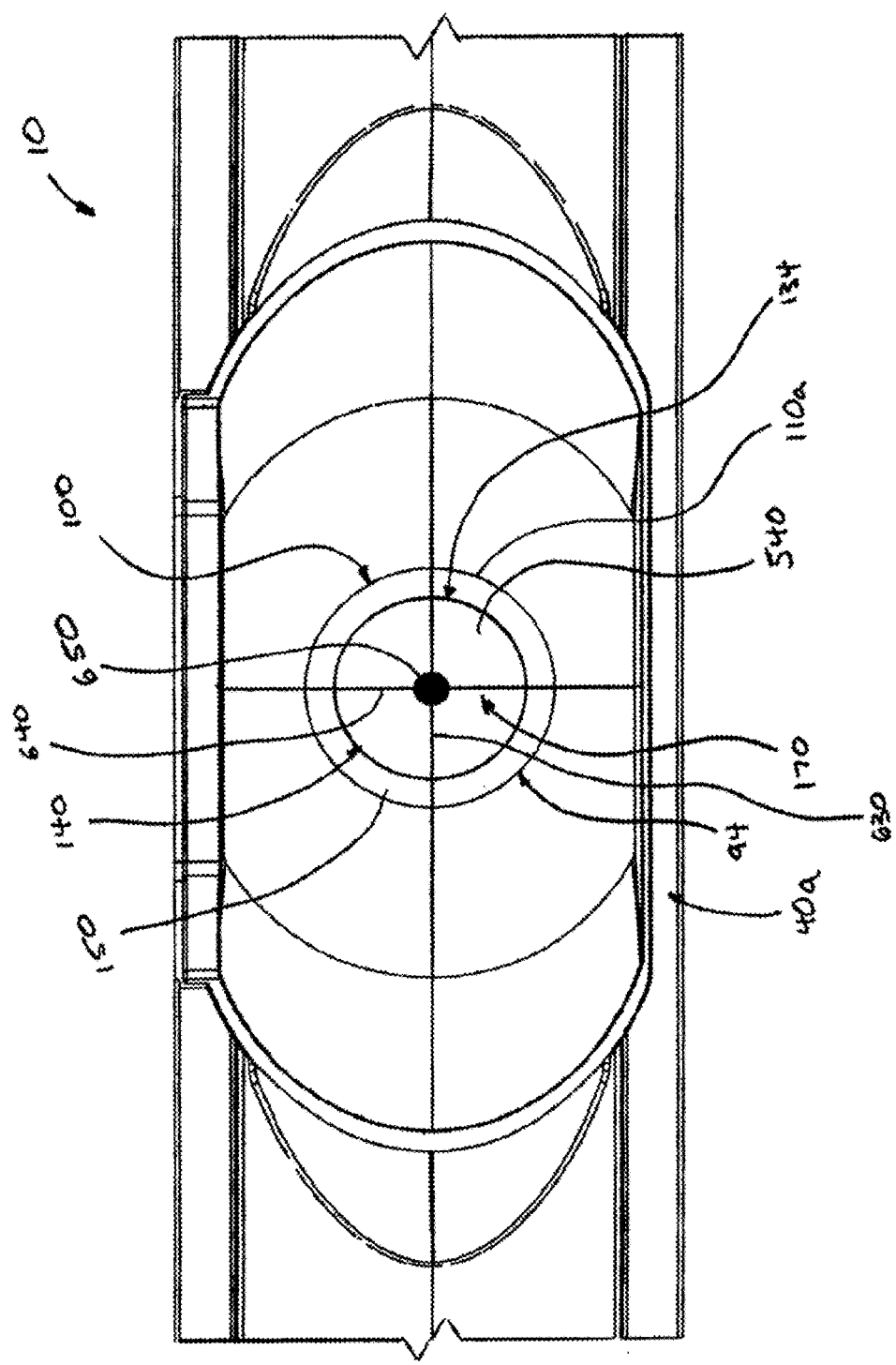
FIG. 15 is a close-up plan view of the front face, polar marking and first indicia of the level.

In other embodiments of the invention, the polar marking of the inner globe is in operable registry relation with the first indicia 170 (i.e., the X and Y axes located on the front face 110a of the outer globe) to indicate a position of the rear face of the body in relation to a surface in question 180 located adjacent to the rear face. FIG. 15 thus illustrates a close-up plan view of the front face 40a of the level 10 illustrating the level resting on its rear face 40b such that the rear face of the level is lying horizontally and facing downwardly (i.e., in a "face down" position) and the front face of the level is lying horizontally and facing upwardly (i.e., in a "face up" position). The inner globe 140 is again suspended in the upright position within the liquid 150 of the outer globe 100 such that the inner globe's upper hemisphere 540 is facing upwardly and its lower hemisphere 530 is not visible because it is facing downwardly. The polar marking 650 of the inner globe is in operable registry relation with the first indicia embodiment 170 of FIG. 12 to indicate a position of the rear face of the body in relation to a surface in question 180 located adjacent to the rear face. Thus, with regard to the operable registry relation of the inner globe's polar marking with the first indicia, the polar marking will lie in registry with the intersection of the X and Y axes 630 and 640 located on the front face of the outer globe when the rear face of the level is positioned along a surface in question. The cross-hair defined by the X and Y axes may again optionally include index lines or gradations to allow a user to determine a percent of grade or elevation. Such index lines or gradations along one or both axes of the crosshair may indicate 0, ⅛, ¼, ⅜ and ½ inch per foot measurements, common to plumbers, or other common measurements as well.

Figure 16:
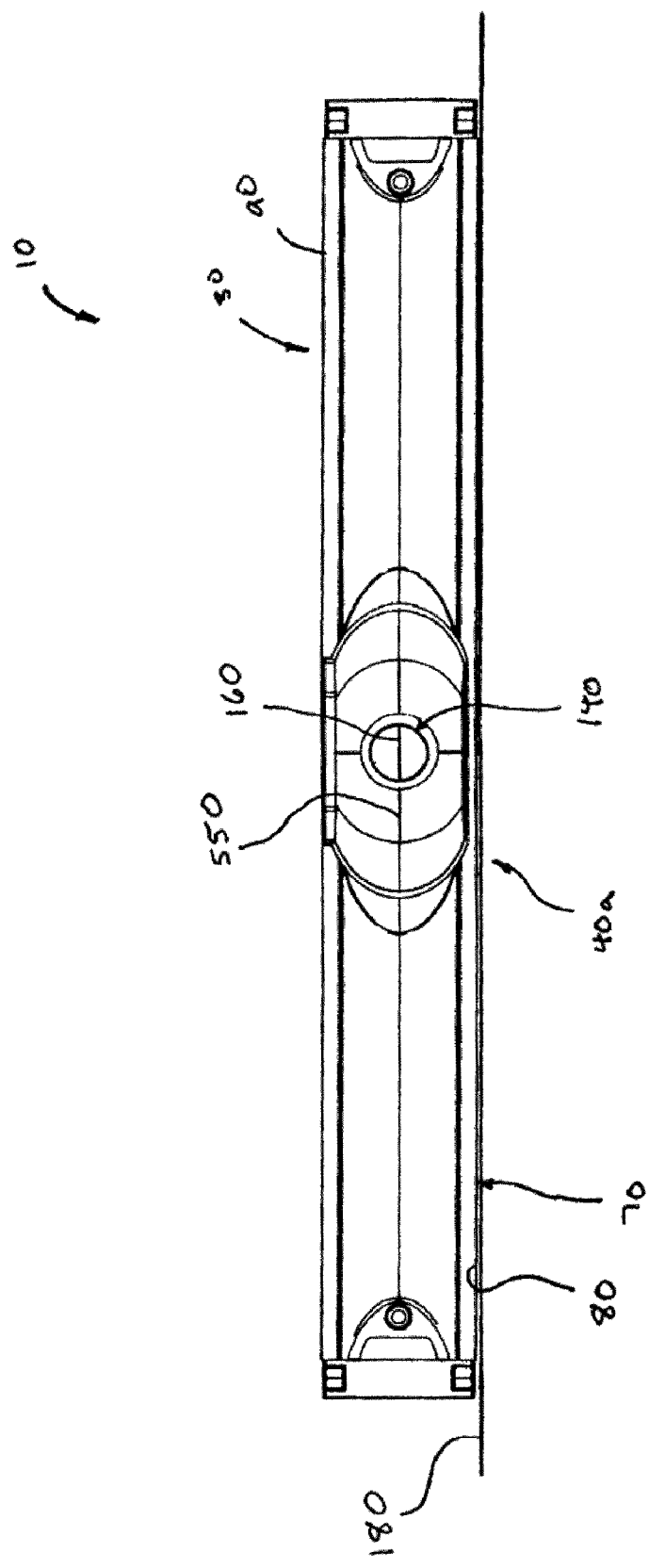
FIG. 16 is a front elevation view of one embodiment of the level verifying a horizontal line or surface in question.
Figure 17:
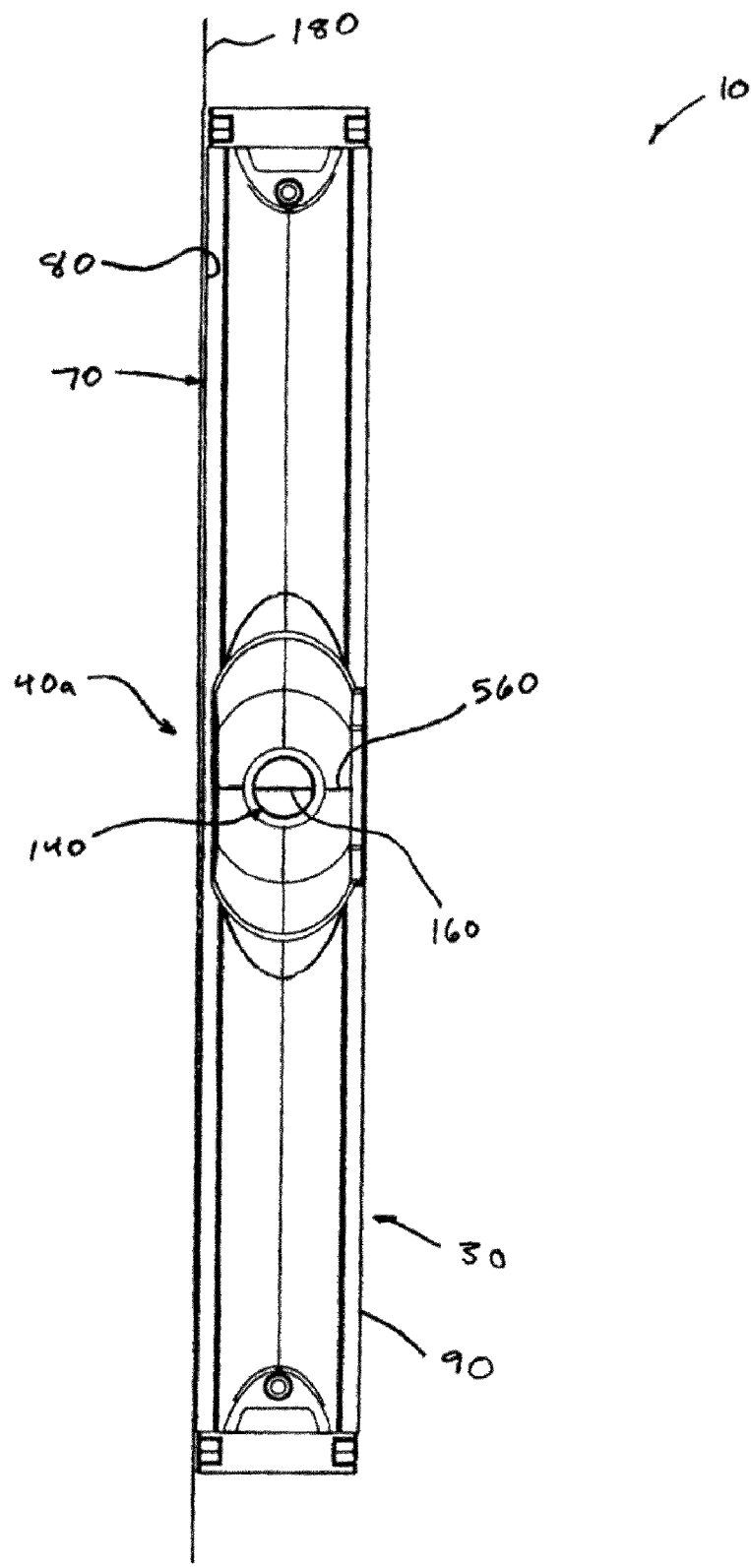
FIG. 17 is a front elevation view of one embodiment the level verifying a vertical line or surface in question.

FIGS. 16-19 and 21, for the sake of clarity in illustrating the equator of the inner globe of the indicator, show the first indicia of the level including only the outer ends 550 and 560 of the X and Y axes on the body's front face. However, it is understood that the X and Y axes of the outer globe's front face may be additionally or alternatively included as well. Referring to FIG. 16, in a use of the level in determining whether a given line or surface in question 180 is approximately horizontal (i.e., level), the at least one longitudinal surface 70 of the body 30 (i.e., the lower longitudinal surface 80 of the body, or the upper longitudinal surface 90, if present) of the level 10 is positioned adjacent to the given line or surface in question. The equator 160 of the inner globe 140 is generally horizontal and aligned in registry with the outer ends 550 of the X axis of the body's front face 40a when the given line or surface in question is horizontal. Referring to FIG. 17, in determining whether a given line or surface is question 180 is approximately vertical (i.e., plumb), the at least one longitudinal surface 70 of the body 30 (i.e., the lower longitudinal surface 80 of the body, or the upper longitudinal surface 90, if present) of the level 10 is positioned adjacent to the given line or surface in question. The equator 160 of the inner globe 140 is again generally horizontal, but aligned in registry with outer ends 560 of the vertical Y axis of the body's front face 40a when the given line or surface in question is vertical. Thus, in both of the foregoing horizontal and vertical determinations, the operable registry relation between the equator of the inner globe and the first indicia is in relation to a positioning of the at least one longitudinal surface of the level's body.

Figure 18:
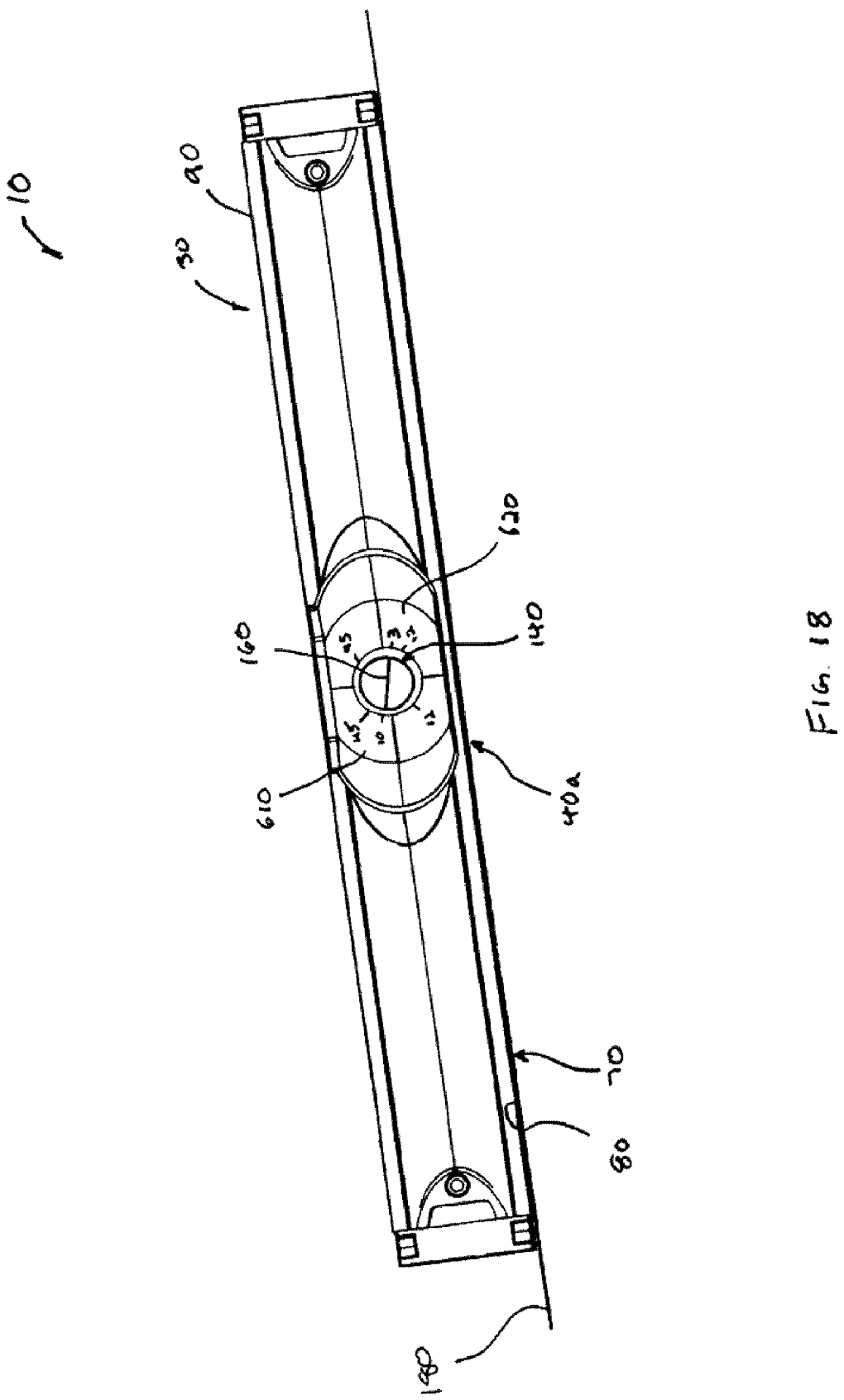
FIG. 18 is a front elevation view of one embodiment of the level verifying a deviation of a line or surface in question from the horizontal.
Figure 19:
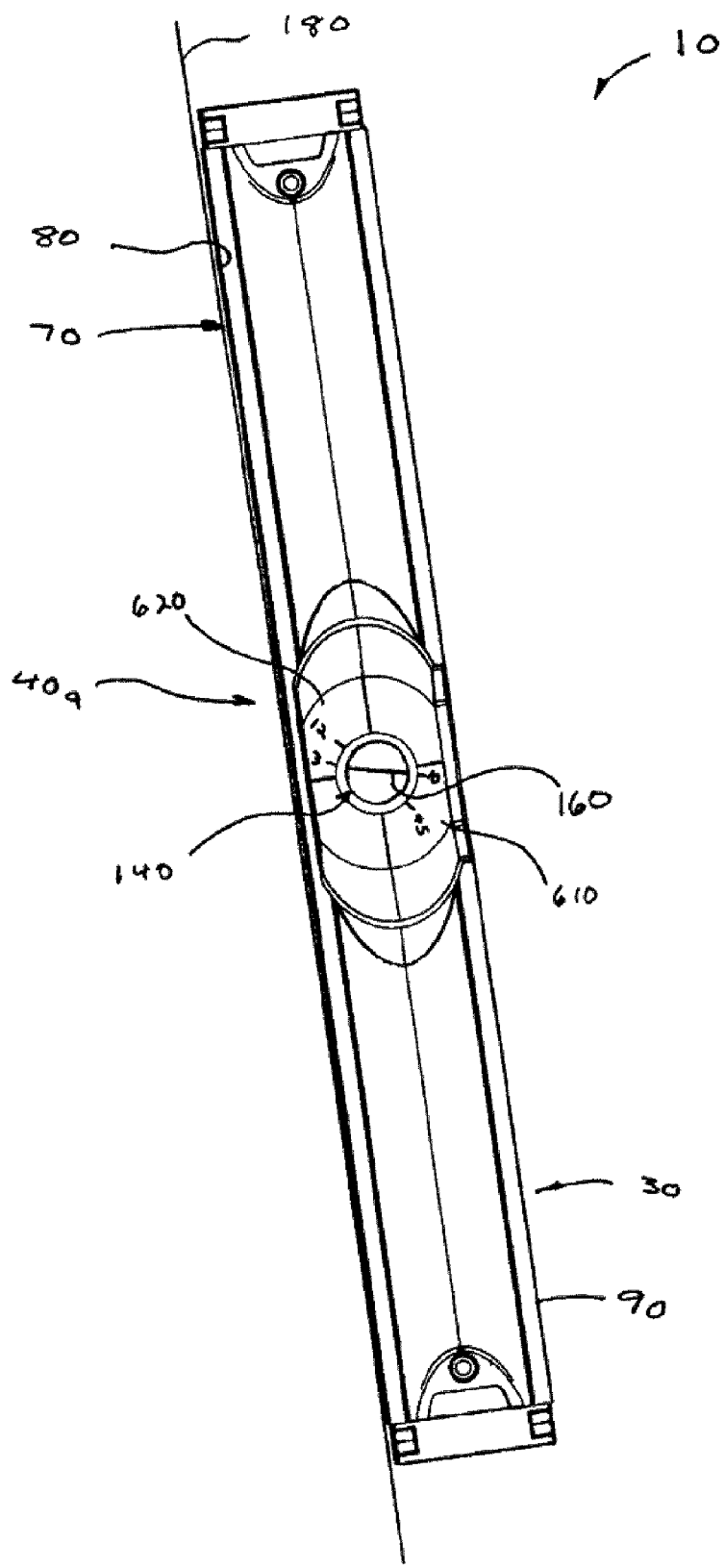
FIG. 19 is a front elevation view of one embodiment of the level verifying a deviation of a line or surface in question from the vertical.

As illustrated in FIG. 18, in use in determining the angle of inclination or pitch of a given line or surface in question 180 from the horizontal, the at least one longitudinal surface 70 of the body 30 (i.e., the lower longitudinal surface 80 of the body, or the upper longitudinal surface 90, if present) of the level 10 is positioned adjacent to the given line or surface in question. The equator 160 of the inner globe 140 is generally horizontal and aligned in registry with the first indicia reciting angle degrees of inclination 610 and/or pitch 620, respectively, to indicate the respective angle and/or pitch values of the given line or surface in question. As illustrated in FIG. 19, in determining the angle of inclination or pitch of a given line or surface in question 180 from the vertical, the at least one longitudinal surface 70 of the body 30 (i.e., the lower longitudinal surface 80 of the body, or the upper longitudinal surface 90, if present) of the level 10 is positioned adjacent to the given line or surface in question. The equator 160 of the inner globe 140 is again generally horizontal, but aligned in registry with the first indicia reciting angle degrees of inclination 610 and/or pitch 620, respectively, to indicate the respective angle and/or pitch values of the given line or surface in question.

Figure 20:
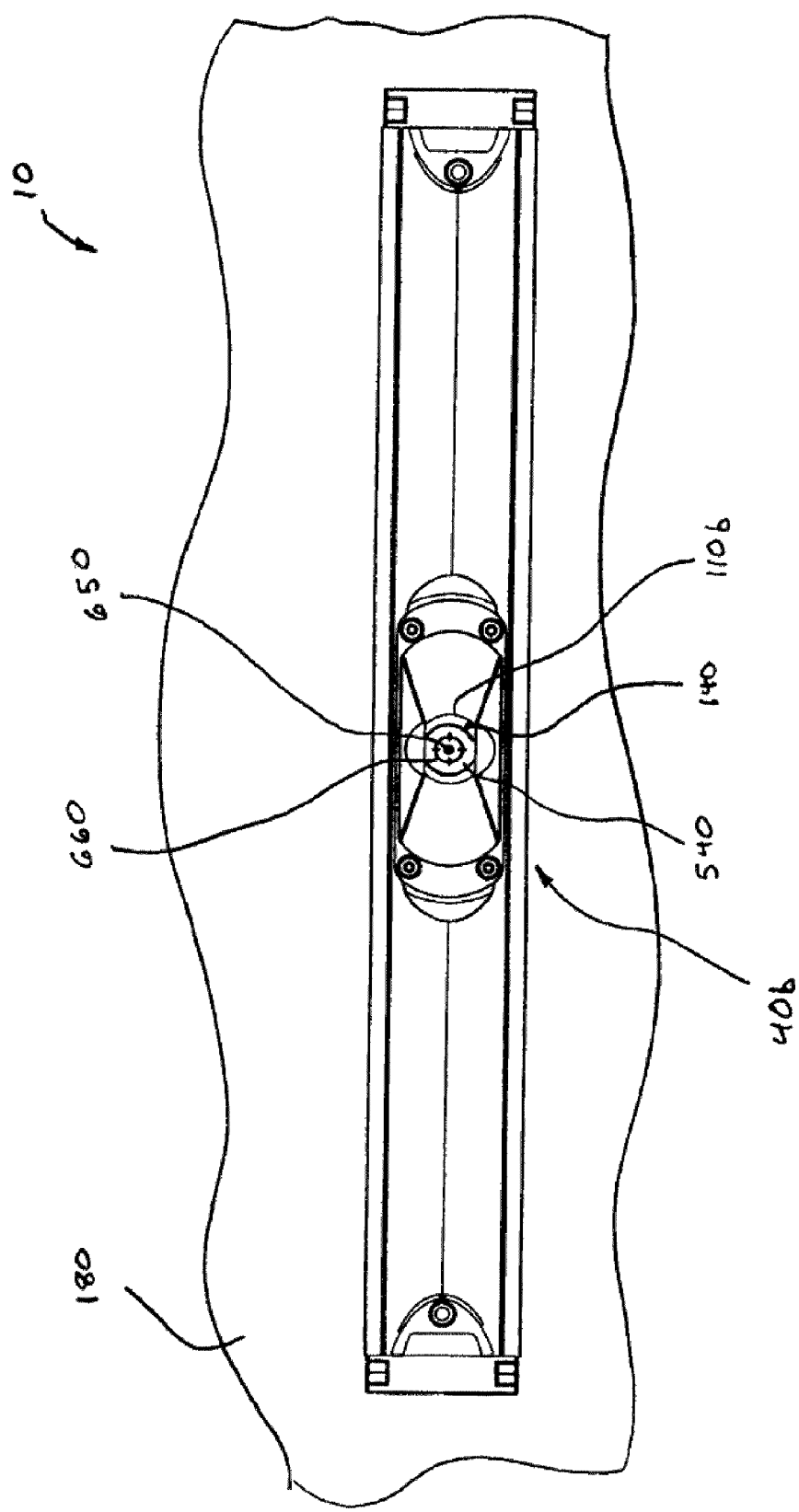
FIG. 20 is a plan view of the rear of one embodiment of the level verifying a planar surface in question along at least two directions.

Referring to FIG. 20, in determining whether a given surface 180 is approximately horizontal (i.e. level) in at least two directions along a plane, the front face 40a of the body 30 of the level 10 is positioned adjacent to and "face down" in relation to the given surface in question, with the rear face 40b of the body of the level thus oriented in a "face up" position. The polar marking 650 of the upper hemisphere 540 of the inner globe 140 is generally concentrically aligned with the center of second indicia 660 (i.e., the cross-hairs and/or plurality of concentric rings) of the outer globe's rear face 110b when the given surface in question is indeed horizontal along the at least two directions. For determining whether a given structure (i.e., a post or column) is approximately vertical (i.e. plumb) along at least two directions, not illustrated herein, it is assumed that an end surface of the post or column is perpendicular to its approximately vertical sides. The front face 40a of the body 30 of the level is positioned adjacent to and "face down" in relation to the end surface of the post or column. The rear face 40b of the body of the level thus faces upwardly. The polar marking 650 of the upper hemisphere 540 of the inner globe 140 is again concentrically aligned with the second indicia 660 (i.e., center of the cross-hairs and/or plurality of concentric rings) of the outer globe's rear face 110b when the sides of the post or column are indeed vertical along the at least two directions. Thus, in both the foregoing horizontal and vertical determinations, the operable registry relation between the marking of the inner globe and the second indicia of the rear face of the outer globe is in relation to a positioning of the front face of the level's body. If the second indicia includes index lines or gradations, a deviation a deviation of a surface in question from the horizontal or vertical along at least two directions may be determined as well via an alignment or registry relation of the polar marking with such index lines or gradations.

In use in the embodiment illustrated in FIG. 21, in determining whether a given surface 180 is approximately horizontal (i.e. level) in at least two directions along a plane, the rear face 40b of the body 30 of the level 10 is positioned adjacent to and "face down" in relation to the given surface in question, with the front face 40a of the body of the level thus oriented in a "face up" position. The polar marking 650 of the upper hemisphere 540 of the inner globe 140 is generally concentrically aligned with the first indicia 170 (i.e., X and Y axes 630 and 640) of the outer globe's front face 110a when the given surface in question is indeed horizontal along the at least two directions. For determining whether a given structure (i.e., a post or column) is approximately vertical (i.e. plumb) along at least two directions, again not illustrated herein, it is again assumed that an end surface of the post or column is perpendicular to its approximately vertical sides. The rear face 40b of the body 30 of the level is positioned adjacent to and "face down" in relation to the end surface of the post or column. The front face 40a of the body of the level thus faces upwardly. The polar marking 650 of the upper hemisphere 540 of the inner globe 140 is again concentrically aligned with the first indicia 170 (i.e., X and Y axes) of the outer globe's front face 110a when the sides of the post or column are indeed vertical along the at least two directions. Thus, in both the foregoing horizontal and vertical determinations, the operable registry relation between the marking of the inner globe and the first indicia of the front face of the outer globe is in relation to a positioning of the rear face of the level's body. If the first indicia includes index lines or gradations, a deviation of a surface in question from the horizontal or vertical along at least two directions may be determined as well via an alignment or registry relation of the polar marking with such index lines or gradations.

While this foregoing description and accompanying figures are illustrative of the present invention, other variations in structure and method are possible without departing from the invention's spirit and scope.

We claim:

1. A level comprising:
   a body defining front and rear faces, a pair of opposing outer ends and at least one longitudinal surface; and
   at least one indicator comprising an outer vessel located at least partially between the front and rear faces of the body and an inner vessel located within the outer vessel, the inner vessel viewable through the outer vessel and defining an equator around its outer periphery, the inner vessel buoyantly biased to maintain the equator in a substantially horizontal position, the equator in operable registry relation with a first indicia to indicate a position of the at least one longitudinal surface of the body.

2. The level of claim 1 wherein the inner vessel comprises an inner spherical globe.

3. The level of claim 2 wherein the outer vessel comprises an outer spherical globe.

4. The level of claim 3 wherein the first indicia comprises at least X and Y axes located about the outer globe, the X and Y axes respectively defining horizontal and vertical reference lines.

5. The level of claim 4 wherein the first indicia further comprises pitch values relating to the X and Y axes.

6. The level of claim 4 wherein the first indicia further comprises angle values relating to the X and Y axes.

7. The level of claim 4 wherein the first indicia further comprises pitch and angle values relating to the X and Y axes.

8. The level of claim 7 wherein the first indicial further comprises X and Y axes located on a front face of the outer globe and aligned with the X and Y axes located about the outer globe.

9. The level of claim 3 wherein the first indicia comprises X and Y axes located on a front face of the outer globe, the X and Y axes respectively defining horizontal and vertical reference lines.

10. The level of claim 3 wherein the inner globe includes a polar marking concentrically centered within an upper hemisphere defined by the equator, the marking in operable registry relation with a second indicia to indicate the position of a front face of the body.

11. The level of claim 10 wherein the second indicia comprises a cross-hair located on a rear face of the outer globe.

12. The level of claim 10 wherein the second indicia comprises a circle located on a rear face of the outer globe.

13. The level of claim 10 wherein the second indicia comprises a circle and cross-hair located on a rear face of the outer globe.

14. The level of claim 4 wherein the inner globe includes a polar marking concentrically centered within an upper hemisphere defined by the equator, the marking in operable registry relation with a second indicia to indicate the position of a front face of the body.

15. The level of claim 14 wherein the second indicia comprises a cross-hair located on a rear face of the outer globe.

16. The level of claim 14 wherein the second indicia comprises a circle located on a rear face of the outer globe.

17. The level of claim 14 wherein the second indicia comprises a circle and cross-hair located on a rear face of the outer globe.

18. The level of claim 7 wherein the inner globe includes a polar marking concentrically centered within an upper hemisphere defined by the equator, the marking in operable registry relation with a second indicia to indicate the position of a front face of the body.

19. The level of claim 18 wherein the second indicia comprises a cross-hair located on a rear face of the outer globe.

20. The level of claim 18 wherein the second indicia comprises a circle located on a rear face of the outer globe.

21. The level of claim 18 wherein the second indicia comprises a circle and cross-hair located on a rear face of the outer globe.

22. The level of claim 8 wherein the inner globe includes a polar marking concentrically centered within an upper hemisphere defined by the equator, the marking in operable registry relation with the first indicia to indicate the position of a rear face of the body.

23. The level of claim 22 wherein the polar marking is also in operable registry relation with a second indicia to indicate the position of a front face of the body.

24. The level of claim 23 wherein the second indicia comprises a cross-hair located on a rear face of the outer globe.

25. The level of claim 23 wherein the second indicia comprises a circle located on a rear face of the outer globe.

26. The level of claim 23 wherein the second indicia comprises a circle and cross-hair located on a rear face of the outer globe.

27. The level of claim 9 wherein the inner globe includes a polar marking concentrically centered within an upper hemisphere defined by the equator, the marking in operable registry relation with the first indicia to indicate the position of a rear face of the body.

28. The level of claim 27 wherein the polar marking is also in operable registry relation with a second indicia to indicate the position of a front face of the body.

29. The level of claim 28 wherein the second indicia comprises a cross-hair located on a rear face of the outer globe.

30. The level of claim 28 wherein the second indicia comprises a circle located on a rear face of the outer globe.

31. The level of claim 28 wherein the second indicia comprises a circle and cross-hair located on a rear face of the outer globe.

32. The level of claim 4 wherein the outer globe is located fully between the front and rear faces of the body.

33. The level of claim 2 wherein the outer vessel comprises a cube.

34. A level comprising:
an elongated body defining front and rear faces, a pair of opposing outer ends and at least one longitudinal surface;
an outer globe located at least partially between the front and rear faces of the body;
an inner globe located within the outer globe, the inner globe viewable through the outer globe and defining an equator around its outer periphery, the inner globe buoyantly biased to maintain the equator in a substantially horizontal position, the equator in operable registry relation with a first indicia to indicate a position of the at least one longitudinal surface of the body;
the first indicia comprising X and Y axes and indexed pitch and angle values located on the front face of the body about the outer globe, the first indicia further comprising X and Y axes located on a front face of the outer globe and aligned with the X and Y axes located on the front face of the body, the X and Y axes of the body and globe together defining horizontal and vertical reference lines; and
the inner globe including a polar marking concentrically centered within an upper hemisphere defined by the equator, the marking in operable registry relation with the first indicia to indicate a position of the rear face of the body.

35. A method of determining whether a given line or surface in question is approximately horizontal, the method comprising:
positioning a surface of a body adjacent to the given line or surface in question;
viewing an equator of an inner globe through an outer globe of the body; and
determining whether the equator is in registry relation with an X axis of a first indicia of the body, the X axis lying parallel to the surface, the registry relation of the equator with the X axis indicating a position of the line or surface in question.

36. A method of determining whether a given line or surface in question is approximately vertical, the method comprising:
positioning a surface of a body adjacent to the given line or surface in question;
viewing an equator of an inner globe through an outer globe of the body; and
determining whether the equator is in registry relation with a Y axis of a first indicia of the body, the Y axis lying perpendicular to the surface, the registry relation of the equator with the Y axis indicating a position of the line or surface in question.

37. A method of determining the angle or pitch of a given line or surface in question, the method comprising:
positioning a surface of a body adjacent to the given line or surface in question;
viewing an equator of an inner globe through an outer globe of the body; and
determining a registry relation of the equator with pitch or angle markings of a first indicia of the body, the registry relation with the pitch or angle markings indicating the pitch or angle of the surface in question.

38. A method of determining whether a given surface in question is approximately level or plumb along at least two directions, the method comprising:
positioning a face of a body adjacent to the given surface in question;

viewing a polar marking of an inner globe through an outer globe of the body; and determining whether the marking is in registry relation with a first indicia located on the outer globe, the registry relation of the marking with the indicia indicating a position of the surface in question.

39. A method of determining a deviation of a given surface in question from level or plumb along at least two directions, the method comprising:

positioning a face of a body adjacent to the given surface in question;

viewing a polar marking of an inner globe through an outer globe of the body; and determining a registry relation of the marking with index lines or gradations of a first indicia located on the outer globe, the registry relation of the marking with the index lines or gradations indicating the deviation of the surface in question from level or plumb.

40. A method of determining whether a given surface in question is approximately level or plumb along at least two directions, the method comprising:

positioning a face of a body adjacent to the given surface in question;

viewing a polar marking of an inner globe through an outer globe of the body; and determining whether the marking is in registry relation with a second indicia located on the outer globe, the registry relation of the marking with the indicia indicating a position of the surface in question.

41. A method of determining a deviation of a given surface in question from level or plumb along at least two directions, the method comprising:

positioning a face of a body adjacent to the given surface in question;

viewing a polar marking of an inner globe through an outer globe of the body; and determining a registry relation of the marking with index lines or gradations of a second indicia located on the outer globe, the registry relation of the marking with the index lines or gradations indicating the deviation of the surface in question from level or plumb.

\* \* \* \* \*